United States Patent
Huang et al.

(10) Patent No.: US 11,133,910 B2
(45) Date of Patent: Sep. 28, 2021

(54) METHODS AND ARRANGEMENTS FOR WIDE BANDWIDTH COMMUNICATIONS

(71) Applicant: INTEL IP CORPORATION, Santa Clara, CA (US)

(72) Inventors: Rui Huang, Beijing (CN); Yang Tang, San Jose, CA (US); Jie Cui, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 190 days.

(21) Appl. No.: 16/464,927

(22) PCT Filed: Mar. 23, 2018

(86) PCT No.: PCT/CN2018/080252
§ 371 (c)(1),
(2) Date: May 29, 2019

(87) PCT Pub. No.: WO2018/171730
PCT Pub. Date: Sep. 27, 2018

(65) Prior Publication Data
US 2020/0014523 A1 Jan. 9, 2020

Related U.S. Application Data

(60) Provisional application No. 62/476,103, filed on Mar. 24, 2017.

(51) Int. Cl.
*H04W 4/00* (2018.01)
*H04L 5/00* (2006.01)
(Continued)

(52) U.S. Cl.
CPC .......... *H04L 5/0092* (2013.01); *H04L 5/0094* (2013.01); *H04W 4/80* (2018.02);
(Continued)

(58) Field of Classification Search
CPC .... H04L 5/0092; H04L 5/0094; H04W 76/15; H04W 76/27; H04W 72/0446;
(Continued)

(56) References Cited

U.S. PATENT DOCUMENTS

| | | | | |
|---|---|---|---|---|
| 5,983,275 A | * | 11/1999 | Ecclesine | ................ H04L 49/90 709/231 |
| 2002/0181397 A1 | * | 12/2002 | Licht | ................... H04L 12/2854 370/230 |

(Continued)

FOREIGN PATENT DOCUMENTS

| | | |
|---|---|---|
| CN | 105474682 A | 4/2016 |
| CN | 106535215 A | 3/2017 |

(Continued)

OTHER PUBLICATIONS

Extended European Search Report dated Dec. 16, 2020 for European Application No. 18770418.4.
(Continued)

*Primary Examiner* — Thai D Hoang
(74) *Attorney, Agent, or Firm* — Eschweiler & Potashnik, LLC

(57) ABSTRACT

Logic may receive an initial communication from a user device, the initial communication comprising capabilities. Logic may determine when the capabilities indicate a requirement for measurement gaps. Logic may determine, when the capabilities for the user device indicate a requirement to implement measurement gaps, a gap pattern to assign to the user device to re-tune one or more radio frequency chains to a wide bandwidth carrier frequency during communications. Logic may transmit information about the gap pattern to the user device. Logic may transmit an initial communication to a base station, the initial communication comprising capabilities. Logic may receive a communication from the base station comprising informa- (Continued)

tion about a gap pattern. Logic may receive a synchronization signal to synchronize a wide bandwidth, radio frequency chain. And logic may retune the radio frequency chain during one or more measurement gaps defined by the gap pattern.

19 Claims, 12 Drawing Sheets

(51) Int. Cl.
    H04W 76/15    (2018.01)
    H04W 4/80     (2018.01)
    H04W 76/27    (2018.01)
    H04W 24/10    (2009.01)
    H04W 56/00    (2009.01)
    H04W 72/04    (2009.01)

(52) U.S. Cl.
    CPC ......... H04W 24/10 (2013.01); H04W 56/001 (2013.01); H04W 72/0446 (2013.01); H04W 76/15 (2018.02); H04W 76/27 (2018.02)

(58) Field of Classification Search
    CPC ..... H04W 4/80; H04W 5/0094; H04W 24/10; H04W 56/001
    USPC .................................. 370/328–329, 335–345
    See application file for complete search history.

(56) References Cited

U.S. PATENT DOCUMENTS

| | | | |
|---|---|---|---|
| 2003/0072289 A1* | 4/2003 | Yuang | H04W 28/18 370/338 |
| 2006/0245455 A1* | 11/2006 | Bossler | H04L 1/0054 370/522 |
| 2008/0151751 A1* | 6/2008 | Ponnuswamy | H04L 1/0017 370/232 |
| 2013/0260777 A1* | 10/2013 | Gormley | H04W 72/0473 455/452.1 |
| 2013/0343289 A1* | 12/2013 | Pang | H04W 72/046 370/329 |
| 2015/0223087 A1 | 8/2015 | Yu et al. | |
| 2015/0230112 A1 | 8/2015 | Siomina et al. | |
| 2015/0327054 A1 | 11/2015 | Callender et al. | |
| 2016/0345295 A1* | 11/2016 | Yang | H04W 74/002 |
| 2018/0092085 A1* | 3/2018 | Shaheen | H04W 36/14 |

FOREIGN PATENT DOCUMENTS

| | | |
|---|---|---|
| WO | 2013/184670 A1 | 12/2013 |
| WO | 2014/112920 A1 | 7/2014 |

OTHER PUBLICATIONS

"RAN4#81 Meeting Report." Agenda Item: 3. 3GPP TSG-RAN WG4 Meeting #82, Athens, Greece, Feb. 13-17, 2017. R4-1700401.
International Search Report and Written Opinion for the International Patent Application No. PCT/CN2018/080252, dated Jun. 13, 2018, 6 pages.

* cited by examiner

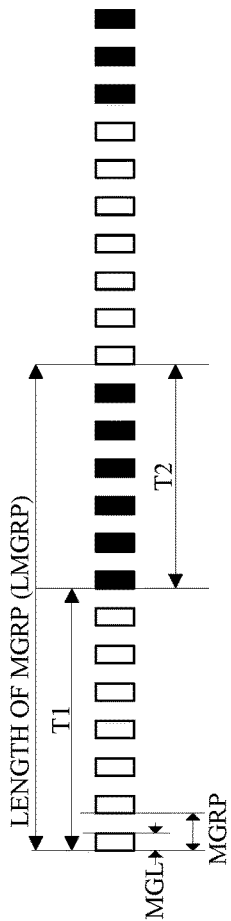

FIG. 6D

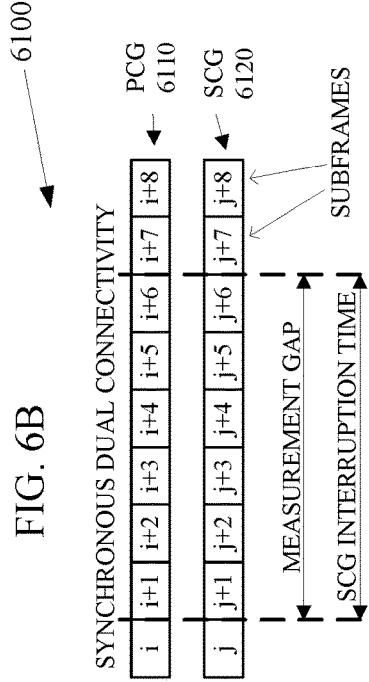

FIG. 6B

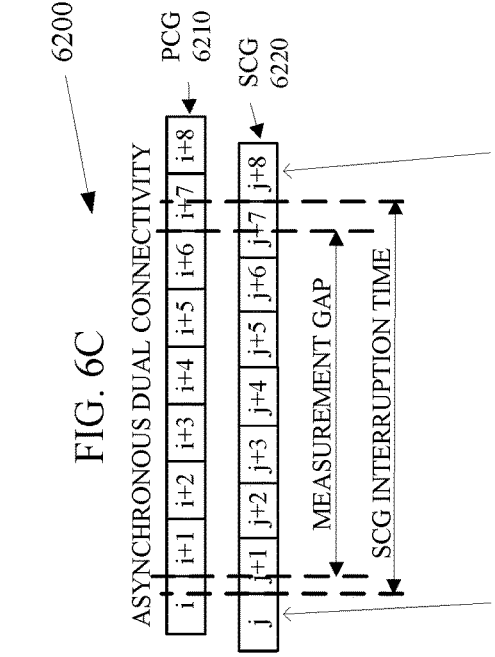

| Gap Pattern Id | MeasurementGap Length (MGL, ms) | Measurement Gap Repetition Period (MGRP, ms) | Number of gaps per burst | Burst repetition period $T_{burst}$ | Measurement Purpose |
|---|---|---|---|---|---|
| nonUniform1 | 6 | 40 | 13 | 1.28s | Inter-Frequency E-UTRAN FDD and TDD |
| nonUniform2 | 6 | 40 | 13 | 2.56s | Inter-Frequency E-UTRAN FDD and TDD |
| nonUniform3 | 6 | 40 | 13 | 5.12s | Inter-Frequency E-UTRAN FDD and TDD |
| nonUniform4 | 6 | 40 | 13 | 10.24s | Inter-Frequency E-UTRAN FDD and TDD |
| NOTE 1: When determining UE requirements nonUniform1, nonUniform2, nonUniform3 or nonUniform4, 60ms shall be assumed as the minimum available time for inter-frequency and inter-RAT measurements during each burst. NOTE 2: The Gap patterns nonUniform1, nonUniform2, nonUniform3 and nonUniform4 cannot be combined with IncMon reduced performance group ||||||

| Gap Pattern Id | Measurement Gap Length (MGL, ms) | Measurement Gap Repetition Period (MGRP, ms) | Minimum available time for inter-frequency and inter-RAT measurements during 480ms period (Tinter1, ms) | Measurement Purpose |
|---|---|---|---|---|
| 0 | 6 | 40 | 60 | Inter-Frequency E-UTRAN FDD and TDD, UTRAN FDD, GERAN, LCR TDD, HRPD, CDMA2000 1x |
| 1 | 6 | 80 | 30 | Inter-Frequency E-UTRAN FDD and TDD, UTRAN FDD, GERAN, LCR TDD, HRPD, CDMA2000 1x |
| 2 | 3 | 40 | 24[NOTE 1,2] | Inter-Frequency E-UTRAN FDD and TDD for cells with time difference as specified below |
| 3 | 3 | 80 | 12[NOTE 1,2] | Inter-Frequency E-UTRAN FDD and TDD for cells with time difference according as specified below |
| FFS: [4] | [6] | [20] | Note 3 | Intra-frequency NR and/or inter-RAT NR |
| [5] | 6 | 160 | Note 3 | Intra-frequency NR and/or inter-RAT NR |
| FFS: [6] | [4] | [20] | Note 3 | Intra-frequency NR and/or inter-RAT NR |
| [7] | 4 | 40 | Note 3 | Intra-frequency NR and/or inter-RAT NR |
| [8] | 4 | 80 | Note 3 | Intra-frequency NR and/or inter-RAT NR |
| [9] | [4] | [160] | Note 3 | Intra-frequency NR and/or inter-RAT NR |
| [10] | 3 | 20 | Note 3 | Intra-frequency NR and/or inter-RAT NR |
| [11] | 3 | 160 | Note 3 | Intra-frequency NR and/or inter-RAT NR |
| FFS: [12] | [5.5] | [20] | Note 3 | Intra-frequency NR and/or inter-RAT NR |
| [13] | [5.5] | 40 | Note 3 | Intra-frequency NR and/or inter-RAT NR |
| [14] | [5.5] | 80 | Note 3 | Intra-frequency NR and/or inter-RAT NR |
| [15] | [5.5] | 160 | Note 3 | Intra-frequency NR and/or inter-RAT NR |
| [16] | [3.5] | 20 | Note 3 | Intra-frequency NR and/or inter-RAT NR |
| [17] | [3.5] | 40 | Note 3 | Intra-frequency NR and/or inter-RAT NR |
| [18] | [3.5] | 80 | Note 3 | Intra-frequency NR and/or inter-RAT NR |
| [19] | [3.5] | 160 | Note 3 | Intra-frequency NR and/or inter-RAT NR |
| [20] | [1.5] | 20 | Note 3 | Intra-frequency NR and/or inter-RAT NR |
| [21] | [1.5] | 40 | Note 3 | Intra-frequency NR and/or inter-RAT NR |
| [22] | [1.5] | 80 | Note 3 | Intra-frequency NR and/or inter-RAT NR |
| [23] | [1.5] | [160] | Note 3 | Intra-frequency NR and/or inter-RAT NR |

NOTE 1: When determining UE requirements using Tinter1 for GP2 and GP3, Tinter1 = [60] for GP2 and Tinter1 = [30] for GP3 shall be used.

NOTE 2: This gap pattern is supported by UEs which support shortMeasurementGap-r14

NOTE 3: Editor's note:NR measurement requirement may not be scaled by Tinter

FIG. 6F

METHODS AND ARRANGEMENTS FOR WIDE BANDWIDTH COMMUNICATIONS

CROSS REFERENCE TO RELATED APPLICATIONS

This application is a national stage application claiming the benefit of and priority to International Application No. PCT/CN2018/080252 entitled "METHODS AND ARRANGEMENTS FOR WIDE BANDWIDTH COMMUNICATIONS", filed Mar. 23, 2018, which claims priority under 35 USC § 119 to U.S. Provisional Application No. 62/476,103, entitled "RRM INTERRUPTION REQUIREMENTS FOR WIDER BANDWIDTH IN NR", filed on Mar. 24, 2017, which are hereby incorporated by reference in their entireties.

TECHNICAL FIELD

Embodiments herein relate to wireless communications, and more particularly, to a radio resource management procedure and/or user equipment interruption requirement for wide and very wide bandwidth communications.

BACKGROUND

Radio resource management (RRM) is the system level management of co-channel interference, radio resources, and other radio transmission characteristics in wireless communication systems such as cellular networks, wireless local area networks, and wireless sensor systems. RRM involves strategies and algorithms for controlling parameters such as transmit power, user allocation, beamforming, data rates, handover criteria, modulation scheme, error coding scheme, etc. An objective of RRM is to utilize the limited radio-frequency spectrum resources and radio network infrastructure as efficiently as possible.

RRM focuses on multi-user and multi-cell network capacity issues, rather than the point-to-point channel capacity. When several users and adjacent base stations share the same frequency channel, efficient dynamic RRM schemes may increase the system spectral efficiency by an order of magnitude. RRM is especially important in systems limited by co-channel interference rather than by noise, for example cellular systems and broadcast networks homogeneously covering large areas, and wireless networks consisting of many adjacent access points that may reuse the same channel frequencies.

BRIEF DESCRIPTION OF THE DRAWINGS

FIGS. 6B-C depict embodiments of uniform or non-uniform measurement gaps and interruption time measurement in synchronous and asynchronous, dual connectivity for both a primary cell group and a secondary cell group for user equipment, such as the user equipment shown in FIGS. 1 and 2;

FIG. 6D depicts an embodiment of non-uniform measurement gaps for user equipment, such as the user equipment shown in FIGS. 1 and 2;

FIG. 6E depicts an embodiment of a table of non-uniform measurement gaps for user equipment indexed by a Gap Pattern identifier (ID) such as the non-uniform gaps illustrated in FIG. 6D;

FIG. 6F depicts an embodiment of a table of uniform measurement gaps for user equipment indexed by a Gap Pattern identifier (ID) such as the uniform gaps illustrated in FIGS. 6B-C;

DETAILED DESCRIPTION OF EMBODIMENTS

Figure 2:
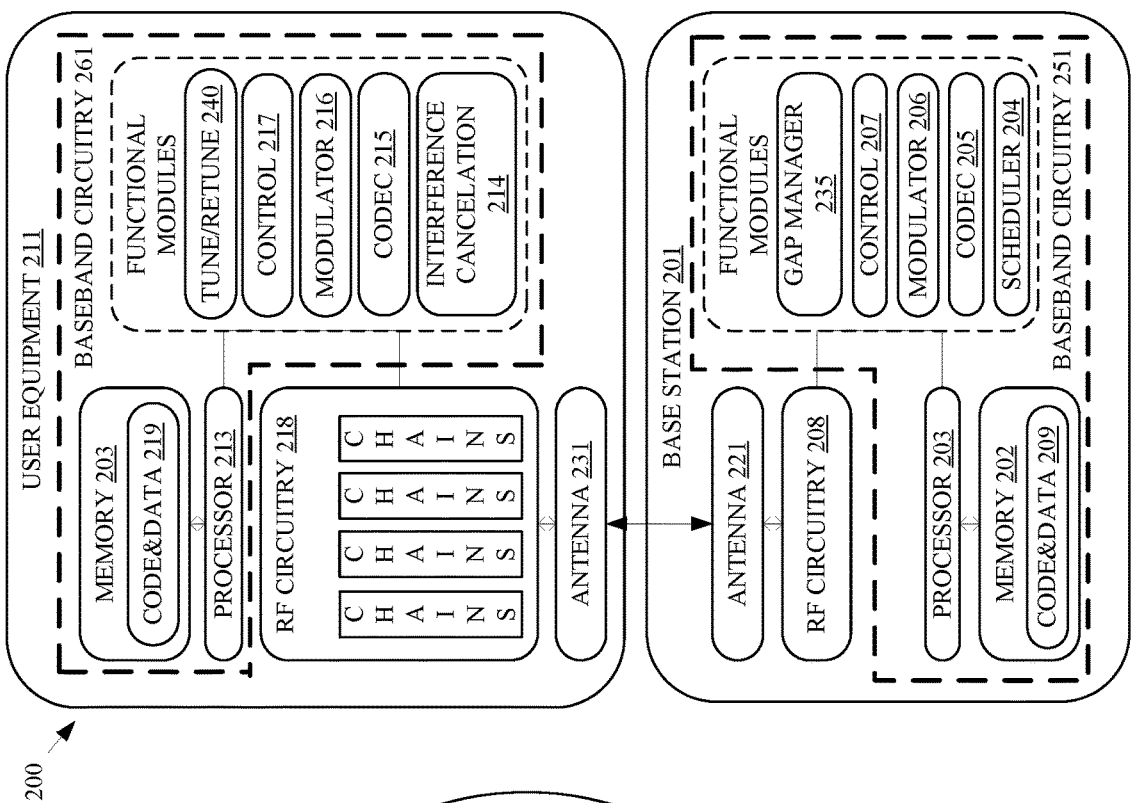
FIG. 2 depicts embodiments of a base station and user equipment, such as the base station and the user equipment illustrated in FIG. 1.

The following is a detailed description of embodiments depicted in the drawings. The detailed description covers all modifications, equivalents, and alternatives falling within the appended claims.

Dynamic RRM schemes adaptively adjust the radio network parameters to the traffic load, user positions, user mobility, quality of service requirements, base station density, etc. The design of wireless systems consider the dynamic RRM scheme with a view to minimize expensive manual cell planning and achieve "tighter" frequency reuse patterns between cells and within cells, resulting in improved system spectral efficiency.

In some embodiments, a Radio Network Controller (RNC) may control several base stations and access points to offer a centralized RRM schemes. Further embodiments offer distributed RRM schemes comprising either autonomous algorithms in mobile stations, base stations or wireless access points, or coordinated algorithms by exchanging information among these stations and access points.

Embodiments may define RRM requirements for a Node B's such as the evolved Node B (eNB) and the Next Generation Node B (gNB) as well as user equipment (UE) for Radio Access Networks (RANs) such as RAN1, RAN2, and RAN4. RAN may be shorthand for E-UTRAN (Evolved Universal Terrestrial Radio Access Network) and the numbers 1, 2, and 4 may represent the release numbers for the 3GPP E-UTRAN specifications.

In RAN1, the UE may have a capability to perform wide bandwidth communications, such as bandwidths of 100 to 400 megahertz (MHz). In RAN4, the UE may have capabilities to perform wide bandwidth communications and very wide bandwidth communications such as bandwidths from 400 MHz to 1 gigahertz (GHz). In many embodiments, the new radio (NR) in the UE for RAN4 may operate on carrier frequencies below 6 GHz, between 6 GHz and 24 GHz, and above 24 GHz such as between 24 GHz and 52 GHz.

To accomplish the wider bandwidth communications, in some embodiments, the physical layer (PHY) device of the UE may perform carrier aggregation (CA) to aggregate with more than one RF chains. In other words, the UE may advantageously reuse more than one narrow or wide bandwidth receive (Rx) and transmit (Tx) chains for other radio access technologies (RATs) by synchronizing each of the RF chains to a different portion of the wider bandwidth.

CA may involve aggregation of more than one bandwidths of component carriers transmitted via the RF chains to form contiguous and/or non-contiguous frequency bands. Contiguous bandwidths may advantageously transmit signals on the subcarriers across the entire bandwidth. Non-contiguous bandwidths may advantageously skip portions (frequency ranges) of the wide or very wide bandwidths that, e.g., include interference, are reserved for other communications or systems, or the like. In some embodiments, the UE may also include a tune/retune functional module that may be circuitry or a combination of circuitry and code executing on processor circuitry to manage the error or tolerances in synchronization within and between the RF chains.

Other embodiments may accomplish the wider bandwidth communications by inclusion of a single wide bandwidth and/or very wide bandwidth RF chain. Such embodiments may advantageously avoid complexities that add code and/or circuitry to address the combination of multiple RF chains but may also require retuning.

The new bandwidth requirements introduce issues related to channel measurement and dual connectivity for stand-alone and non-stand-alone operation. For example, during initial access to a base station such as the eNB and/or the gNB, the UE may synchronize with the base station with a single measurement signal such as a new radio (NR) secondary synchronization signal (SSS), which may transmit at, e.g., the center of the wide or very wide bandwidth channel. After the initial synchronization, the one or more of the radio frequency (RF) chains of the UE may require retuning for various reasons such as fading channel that results, at least in part, on the design of the PHY of the UE and, in part on the environment.

Fading channel is the variation or the attenuation of a signal with various variables. These variables include time, geographical position, and radio frequency. Fading is often modeled as a random process. Fading channel may result from multipath propagation, referred to as multipath induced fading, weather (particularly rain), or shadowing from obstacles affecting the wave propagation, sometimes referred to as shadow fading. The presence of reflectors in the environment surrounding a transmitter and receiver create multiple paths that a transmitted signal can traverse. As a result, the receiver receives the superposition of multiple copies of the transmitted signal, each traversing a different path. Each signal copy will experience differences in attenuation, delay, and phase shift while travelling from the source to the receiver. This can result in either constructive or destructive interference, amplifying or attenuating the signal power seen at the receiver.

With respect to embodiments that employ CA to combine multiple narrow or wide bandwidth RF chains to form a wide or very wide bandwidth RF chain, one or more of the RF chains may require retuning to synchronize the RF chains to the component carrier (CC) or carrier frequency of the wide or very wide bandwidth channel as a result of fading channel, switching between narrow band (NB) and wide band (WB) communications, and switching between wide band component carriers or carrier frequencies. For example, one or more of the RF chains may experience a phase drift due to an inaccuracy in the initial measurement of the single synchronization signal. Consider two RF chains, RF chain 1 and RF chain 2, that combine to form a contiguous waveform. Each waveform includes a bandwidth to carry tones. The RF chains transmit the tones on subcarriers that are separated by phase shifts that may be fractions of the carrier frequency. Furthermore, a phase drift by RF chain 1 and a phase drift by RF chain 2 would not necessarily occur at the same rate or even in the same direction so the shifts could increase or decrease the spacing of the contiguous subcarriers in the RF chains 1 and 2. A negative phase drift (toward a lower frequency) by the RF chain 1 and a positive phase drift (toward a higher frequency) by RF chain 2 may create a gap in the subcarriers of the RF chains equal to the combined drift. On the other hand, a positive phase drift by the RF chain 1 and a negative phase drift by RF chain 2 may cause interference and/or overlapping of subcarriers in RF chains 1 and 2.

In the non-stand-alone, dual connectivity case, one or more of the RF chains may switch between narrow bandwidth communications and wide bandwidth communications. Such situations require re-synchronization, or retuning, of one or more of the RF chains to the SSS.

With respect to embodiments that employ a single wide and/or very wide bandwidth, RF chain, the measurement bandwidth including one set of synchronization signals (NR-SSS) may not be sufficient to meet the accuracy requirements over the wide band or very wide band channel and may also switch between wide band component carriers for communications in a master cell group (MCG) and a secondary cell group (SCG). Thus, such embodiments may retune the wide band or very wide band RF chain to synchronize the RF chain to two or more carrier frequencies for the wide or very wide bandwidth communications.

While the RF chains may require retuning, allowing significant interruptions in the communications would also significantly impact the overall performance of the communications network. Furthermore, retuning should not cause such as an interruption that the process of retuning causes the UE to lose connection with one or more base stations. To maintain performance, the RAN standards establish interruption requirements that UE must meet to maintain network performance and connections with the base stations. For instance, in some embodiments, the interruption requirement may indicate that only a certain percentage of data can be lost over a period of time when UE is expected to be capable of receiving communications. In some embodiments, the interruption requirement allows the user device an interruption of up to a percentage of subframes of a radio frame such as a percentage of subframes on PCell for both uplink and downlink communications or for uplink and/or downlink communications. In some embodiments, the interruption requirement may establish a maximum duration during which UE can be unable to receive a communication when UE is expected to be capable of receiving communications. In many embodiments, when the UE is configured with one wideband carrier for wider bandwidth operation (BWP) while the UE utilizes multiple receive/transmit (Rx/Tx) chains, the UE is allowed an interruption of up to X subframes on primary cell (PCell) during the RRC reconfiguration procedure for both uplink and downlink of PCell, where X is a positive integer such as less than 5 or greater than 5. In further embodiments, the interruption requirement may be a combination of these requirements, other requirements, combinations of other requirements, and/or the like.

For a UE that requires retuning, the baseband circuitry of the medium access control (MAC) layer and the PHY may coordinate retuning. The retuning may involve concurrent monitoring of all the frequency layers to identify and measure one or more of the inter-frequency and/or inter-RAT cells and to adjust, as necessary, the carrier frequency for each of the one or more RF chains as well as the phase and amplitude corrections for corresponding subcarriers within each of the RF chains. In other words, the tuning process establishes the carrier frequency as well as phase and amplitude corrections and retuning may adjust the carrier frequency as well as the weights and phase shifts to refine the tuning. For instance, once the UE is in the radio resource control (RRC) layer connected state monitoring of all the frequency layers may involve monitoring E-UTRA intra frequency, E-UTRA inter frequency, Inter-RAT UTRA Frequency Division Duplex (FDD), UTRA Time Division Duplex (TDD), and Global System for Mobile communication (GSM) measurements that are applicable to the UE. Many embodiments have configured measurement types such as Primary Common Control Physical Channel (P-CCPCH), Received Signal Code Power (RSCP), Common Pilot Channel (CPICH) measurements, High Rate Packet Data (HRPD), Code Division Multiple Access (CDMA), Global Navigational Satellite System (GSM) carrier Received Signal Strength Indicator (RSSI), Reference Signal Received Power (RSRP), Reference Signal Received Quality (RSRQ), Reference Signal Received Power (RSTD), Reference Signal-Signal to Noise and Interference Ratio (RS-SINR), New Radio Synchronization Signal-Reference Signal Received Power (NR SS-RSRP), New Radio Synchronization Signal-Reference Signal Received Quality (NR SS-RSRQ), and New Radio Synchronization Signal-Signal to Noise and Interference Ratio (NR SS-SINR). The RRC layer connected state is an initial connection between a UE and a base station in which the RRC layer of the base station connects with the RRC layer of the UE.

In some embodiments, the baseband circuitry of the UE may perform the retuning in a manner that causes a minimal disruption to communications with a base station. For instance, the UE may retune infrequently enough and/or during opportune time periods such that interruptions that result from the retuning fall within bounds or limits of one or more criteria of the interruption requirement. Maintaining interruptions within the bounds of the criteria may avoid losing or dropping the connection between the UE and the base station. In several embodiments, the criteria may describe an interruption time and the bounds of the criteria may be, e.g., a maximum allowable interruption time that can avoid losing the connections. Other criteria may describe a percentage or ratio of lost data in communications between the UE and the base station and the bounds may be, e.g., the maximum percentage or ratio of data lost to data successfully received, or vice versa. For instance, the interruption requirement may allow the user device an interruption of up to a percentage of subframes of a communication such as a percentage of subframes on PCell for uplink and/or downlink communications. Further criteria may describe a duration, in time units such as milliseconds, of the total interruption in communications with the base station during a period of time and the bounds may be, e.g., the maximum duration for an interruption that can occur without losing the connection between the UE and the base station. In several embodiments, when the UE is configured with one wideband carrier for wider bandwidth operation while the UE utilizes multiple Rx/Tx chains, the UE is allowed an interruption of up to a specified number of subframes on PCell and/or secondary cell (SCell) during the RRC reconfiguration procedure for the uplink and/or downlink of the PCell and/or the SCell. Some embodiments employ other criteria and/or other bounds.

In other embodiments, the base station may coordinate times, or measurement gaps, during which the UE can retune one or more RF chains. Assignment of measurement gaps to the UE advantageously avoids the interruption requirement by providing time during which the UE is not expected to transmit or receive traffic data and during which the UE can retune one or more RF chains for the wide bandwidth or very wide bandwidth channel. Furthermore, selective use of the measurement gaps advantageously allows equipment that does not require, or lacks a requirement for, the measurement gaps to avoid the communication delays associated with the measurement gaps and advantageously allows equipment that requires the measurement gaps to meet the interruption requirement.

For RANs, the base station may execute code and protocols for E-UTRA (Evolved Universal Terrestrial Radio Access), an air interface for base stations and interaction with other devices in the E-UTRAN such as UE. The E-UTRA may include the radio resource management (RRM) in a radio resource control (RRC) layer and the RRM may determine, assign, and schedule the measurement gaps for UE by transmitting, to the UE, a list of one or more of the measurement gaps in an RRC layer information element (IE) via one or more MAC layer Service Data Units (MSDUs) encapsulated in one or more PHY radio frames. In other embodiments, the RRM may indicate the gap pattern to the UE via the RRC layer.

In several embodiments, the RRM may communicate with UE to receive signaling from the UE that indicates the measurement gap capabilities of the UE and may determine a pattern of one or more measurement gaps based on the capabilities of the UE. For instance, the RRM may look-up a set of measurement gaps based on the capabilities of the UE in a table or list in memory.

As part of the E-UTRAN, the UE may implement one or more protocols related to the measurement gaps. For instance, the MAC layer may not transmit or receive any data during the measurement gaps. In some embodiments, a receiver of the UE is not expected to tune to a carrier frequency related to the E-UTRAN protocols of a PCell (Primary Cell) and any SCell (Secondary Cell). Furthermore, if the UE supports dual connectivity (DC) and is configured with a PSCell (Primary Secondary Cell), during the total interruption time, the UE may not transmit and receive any data in a Secondary Cell Group (SCG). Further still, in the uplink subframe occurring immediately after a measurement gap, the UE may determine whether or not the UE can transmit data if all the serving cells belong to E-UTRAN Time Division Duplex (TDD) and if the subframe occurring immediately before the measurement gap is an uplink subframe. Otherwise, the UE may not transmit any data.

The PCell is the cell operating on the primary frequency in which the UE either performs the initial connection establishment procedure or initiates the connection re-establishment procedure to connect with the RRC of a base station, or the cell indicated as the primary cell in the handover procedure between base stations or Radio Access Technologies (RATs). The SCell is a cell operating on a secondary frequency, which may be configured once an RRC connection is established and which may be used to provide additional radio resources and/or for load balancing between base stations. For a UE configured with dual connectivity (DC), the subset of serving cells that are not part of the Master Cell Group (MCG), and that comprise the PSCell and zero or more other secondary cells is referred to as the Secondary Cell Group (SCG). Furthermore, a PSCell is the SCG cell in which the UE is instructed to perform random access or initial Physical Uplink Shared Channel (PUSCH) transmission if random access procedure is skipped when performing an SCG change procedure.

Cells generally refer to the geographic location serviced by a base station such as an eNB and a gNB. Each cell is associated with an ID to uniquely identify cells, at least within the local area, and cells have various sizes that may depend of the radio coverage of the base station that services the cell.

Various embodiments may be designed to address different technical problems associated wide bandwidth and very wide bandwidth communications such as combining more than one RF chain to form a wide or very wide bandwidth RF chain, retuning one or more RF chains after establishing an initial connection with a base station, retuning the one or more RF chains without losing a connection with a base station, switching to a wide band component carrier from a narrow band component carrier, tuning or retuning one or more RF chains that have bandwidths far from a synchronization signal at a central frequency of a wide or very wide bandwidth channel, meeting interruption requirements of a RAT, switching between component carriers for a wideband channel, and/or the like.

Different technical problems such as those discussed above may be addressed by one or more different embodiments. Embodiments may address one or more of these problems associated wide bandwidth and very wide bandwidth communications. For instance, some embodiments that address problems associated with wide bandwidth and very wide bandwidth communications may do so by one or more different technical means, such as, receiving an initial communication from a UE to connect with an RRC layer of the base station, receiving a packet comprising capabilities related to measurement gaps from a UE, transmitting an initial communication from a UE to connect with an RRC layer of the base station, transmitting a packet comprising capabilities related to measurement gaps from a UE, determining a set of one or more measurement gaps or a gap pattern for a UE base on the capabilities of the UE, determining a non-uniform gap pattern for a UE, determining a minimum available time for inter-frequency and inter-RAT measurements during a time period, selecting a gap pattern for a UE from a table based on the capabilities of the UE, transmitting a gap pattern for a UE based on the UE capabilities, transmitting a measurement gap repetition period for a UE based on capabilities of the UE, transmitting a number of gaps per burst and a burst repetition period of the gap pattern based on UE capabilities, transmitting a minimum available time for inter-frequency and inter-RAT measurements during a time period, transmitting an index for a gap pattern, transmitting data about a gap pattern in an information element, determining a frequency offset for a secondary base station of a UE, transmitting the frequency offset to the UE, and/or the like.

Several embodiments comprise systems with multiple processor cores such as central servers, access points, and/or stations (STAs) such as modems, routers, switches, servers, workstations, netbooks, mobile devices (Laptop, Smart Phone, Tablet, and the like), sensors, meters, controls, instruments, monitors, home or office appliances, Internet of Things (IoT) gear (watches, glasses, headphones, cameras, and the like), and the like. Some embodiments may provide, e.g., indoor and/or outdoor "smart" grid and sensor services. In various embodiments, these devices relate to specific applications such as healthcare, home, commercial office and retail, security, and industrial automation and monitoring applications, as well as vehicle applications (automobiles, self-driving vehicles, airplanes, drones, and the like), and the like.

The techniques disclosed herein may involve transmission of data over one or more wireless connections using one or more wireless mobile broadband technologies. For example, various embodiments may involve transmissions over one or more wireless connections according to one or more 3rd Generation Partnership Project (3GPP), 3GPP Long Term Evolution (LTE), 3GPP LTE-Advanced (LTE-A), 4G LTE, and/or 5G New Radio (NR), technologies and/or standards, including their revisions, progeny and variants. Various embodiments may additionally or alternatively involve transmissions according to one or more Global System for Mobile Communications (GSM)/Enhanced Data Rates for GSM Evolution (EDGE), Universal Mobile Telecommunications System (UMTS)/High Speed Packet Access (HSPA), and/or GSM with General Packet Radio Service (GPRS) system (GSM/GPRS) technologies and/or standards, including their revisions, progeny and variants.

Examples of wireless mobile broadband technologies and/or standards may also include, without limitation, any of the Institute of Electrical and Electronics Engineers (IEEE) 802.16 wireless broadband standards such as IEEE 802.16m and/or 802.16p, International Mobile Telecommunications Advanced (IMT-ADV), Worldwide Interoperability for Microwave Access (WiMAX) and/or WiMAX II, Code Division Multiple Access (CDMA) 2000 (e.g., CDMA2000 1×RTT, CDMA2000 EV-DO, CDMA EV-DV, and so forth), High Performance Radio Metropolitan Area Network (HIPERMAN), Wireless Broadband (WiBro), High Speed Downlink Packet Access (HSDPA), High Speed Orthogonal Frequency-Division Multiplexing (OFDM) Packet Access (HSOPA), High-Speed Uplink Packet Access (HSUPA) technologies and/or standards, including their revisions, progeny and variants.

Some embodiments may additionally or alternatively involve wireless communications according to other wireless communications technologies and/or standards. Examples of other wireless communications technologies and/or standards that may be used in various embodiments may include, without limitation, other IEEE wireless communication standards such as the IEEE 802.11, IEEE 802.11a, IEEE 802.11b, IEEE 802.11g, IEEE 802.11n, IEEE 802.11u, IEEE 802.11ac, IEEE 802.11ad, IEEE 802.11ae, IEEE 802.11af, IEEE 802.11ah, IEEE 802.11ai, IEEE 802.11-2016 and/or standards, High-Efficiency Wi-Fi standards developed by the IEEE 802.11 High Efficiency WLAN (HEW) Study Group, Wi-Fi Alliance (WFA) wireless communication standards such as Wi-Fi, Wi-Fi Direct, Wi-Fi Direct Services, Wireless Gigabit (WiGig), WiGig Display Extension (WDE), WiGig Bus Extension (WBE), WiGig Serial Extension (WSE) standards and/or standards developed by the WFA Neighbor Awareness Networking (NAN) Task Group, machine-type communications (MTC) standards such as those embodied in 3GPP Technical Report (TR) 23.887, 3GPP Technical Specification (TS) 22.368, 3GPP TS 23.682, 3GPP TS 36.133, 3GPP TS 36.321, 3GPP TS.331, 3GPP TS 38.133, 3GPP TS 38.321, and/or 3GPP TS 38.331, and/or near-field communication (NFC) standards such as standards developed by the NFC Forum, including any revisions, progeny, and/or variants of any of the above. The embodiments are not limited to these examples.

Figure 1:
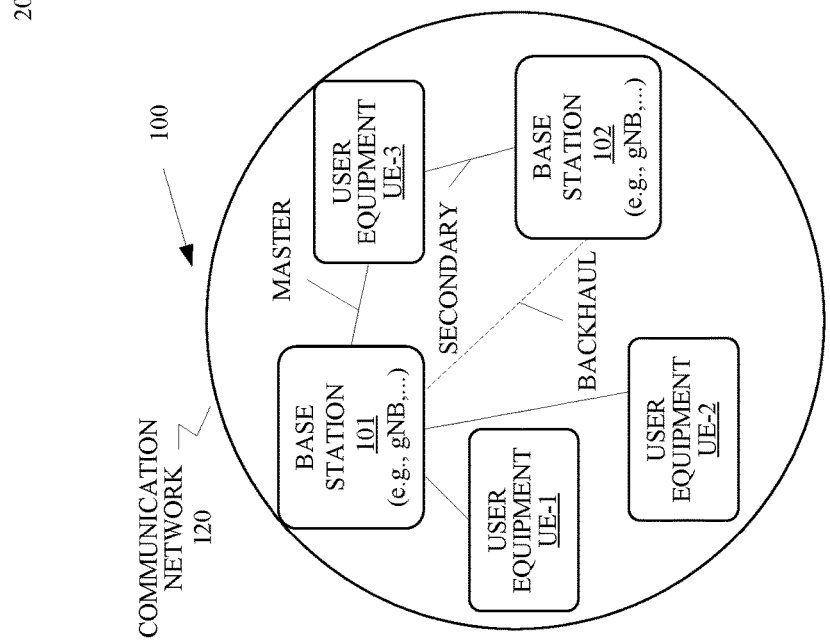
FIG. 1 depicts an embodiment of a system including a base station and user equipment interconnected via a communication network.

FIG. 1 illustrates a communication network 120 to support wide band communications such as communications with bandwidths between 100 MHz and 400 MHz and/or very wide band communications such as communications with bandwidths between 400 MHz and 1 GHz or greater. The communication network 100 is an OFDM network comprising a primary base station 101, a first user equipment UE-1, a second user equipment UE-2, a third user equipment UE-3, and a secondary base station 102. In a 3GPP system based on an OFDMA downlink, the radio resource is partitioned into subframes in time domain and each subframe comprises of two slots. Each OFDMA symbol further consists of a number of OFDMA subcarriers in frequency domain depending on the system bandwidth. The basic unit of the resource grid is called Resource Element (RE), which spans an OFDMA subcarrier over one OFDMA symbol. Resource blocks (RBs) comprise a group of REs, where each RB may comprise, e.g., 12 consecutive subcarriers in one slot.

Several physical downlink channels and reference signals use a set of resource elements carrying information originating from higher layers of code. For downlink channels, the Physical Downlink Shared Channel (PDSCH) is the main data-bearing downlink channel, while the Physical Downlink Control Channel (PDCCH) may carry downlink control information (DCI). The control information may include scheduling decision, information related to reference signal information, rules forming the corresponding transport block (TB) to be carried by PDSCH, and power control command. UEs may use cell-specific reference signals (CRS) for the demodulation of control/data channels in non-precoded or codebook-based precoded transmission modes, radio link monitoring and measurements of channel state information (CSI) feedback. UEs may use UE-specific reference signals (DM-RS) for the demodulation of control/data channels in non-codebook-based precoded transmission modes.

The communication network 120 may comprise a cell such as a micro-cell or a macro-cell and the base station 101 may provide wireless service to UEs within the cell, while the base station 102 may provide wireless service to UEs 110 within another cell located adjacent to or overlapping the cell. In other embodiments, the communications network 120 may comprise a macro-cell and the base station 102 may operate a smaller cell within the macro-cell such as a micro-cell or a picocell. Other examples of a small cell may include, without limitation, a micro-cell, a femto-cell, or another type of smaller-sized cell.

In various embodiments, the base station 101 and the base station 102 may communicate over a backhaul. In some embodiments, the backhaul may comprise a wired backhaul. In various other embodiments, backhaul may comprise a wireless backhaul.

In the present embodiment, the UE-1 may support wide or very wide band communications and may include multiple radio frequency (RF) chains to combine with carrier aggregation to form a very wideband or wideband transmitter and receiver. Carrier aggregation is a process by which the UE-1 can synchronize the component carriers for each of two or more RF chains to form a contiguous, very wide or wide bandwidth RF chain for transmission and receipt of very wide or wide bandwidth communications. For example, the UE-1 may comprise four 80 MHz bandwidth RF chains and may synchronize the component carrier of the first RF chain to be in the middle of the first quarter of a 320 MHz bandwidth channel, may synchronize the component carrier of the second 80 MHz bandwidth of the second RF chain to be in the middle of the second quarter of a 320 MHz bandwidth channel, may synchronize the component carrier of the third 80 MHz bandwidth of the third RF chain to be in the middle of the third quarter of a 320 MHz bandwidth channel, and may synchronize the component carrier of the fourth 80 MHz bandwidth of the fourth RF chain to be in the middle of the fourth quarter of a 320 MHz bandwidth channel.

The baseband circuitry and physical layer (PHY) circuitry of the UE-1 may be capable of measuring a synchronization signal such as a secondary synchronization signal transmitted at the center of the 320 MHz wide bandwidth and synchronizing the four 80 MHz bandwidth RF chains such that the four 80 MHz bandwidth RF chains do not require further tuning or retuning and also meet the interruption requirement for communications via the 320 MHz bandwidth channel.

During the initial connection between the radio resource control (RRC) layer of the base station 101 and the UE-1, the UE-1 may transmit signaling such as an initial communication comprising an information element that includes an indication that the UE-1 does not require, or lacks a requirement for, measurement gaps for retuning but that the UE-1 does support the wider bandwidth operation (BWP) by aggregating more than one RF chains via carrier aggregation. In response, the base station 101 may receive the signaling from the UE-1; determine that the UE-1 does not require, or lacks a requirement for, measurement gaps; not assign measurement gaps to the UE-1; transmit a synchronization signal; and communicate with the UE-1 without imposing measurement gap protocols.

In the present embodiment, the UE-2 may support wide band communications and may include multiple radio frequency (RF) chains to combine with carrier aggregation to form a wideband transmitter and receiver. The UE-2 may synchronize the component carriers for each of two or more RF chains to form a contiguous wide band RF chain for transmission and receipt of wide bandwidth communications. The UE-2 may be capable of communications through multiple radio access technologies (RATs) and may use one or more of the same RF chains that form the wide bandwidth RF chain as narrow band RF chains on a different component frequency. The baseband circuitry and physical layer (PHY) circuitry of the UE-2 may not be capable of measuring a synchronization signal transmitted at the center of the 320 MHz wide bandwidth and accurately synchronizing the two or more RF chains without further tuning or retuning. Furthermore, the baseband circuitry and physical layer (PHY) circuitry of the UE-2 may require time to switch synchronizations of the one or more RF chains between the wide bandwidth component carrier and one or more narrow bandwidth component carriers.

In some embodiments, the baseband and PHY of the UE-2 may be capable of retuning the one or more RF chains within the interruption requirement. In such embodiments, during the initial connection with the base station 101 to connect with the RRC layer of the base station, the UE-2 may signal to the base station 101 that the UE-2 does not require measurement gaps to retune the RF chains. In response, the base station 101 may receive the signaling from the UE-2, determine that the UE-2 does not require measurement gaps, not assign measurement gaps to the UE-2, transmit a synchronization signal, and communicate with the UE-2 without imposing measurement gap protocols. Thereafter, the UE-2 may communicate with the base station 101 via the wide bandwidth channel and retune as necessary within the interruption requirement. For instance, the interruption requirement may require that the UE-2 perform retuning without interrupting more than, e.g., 0.5% of communications. In other words, the UE-2 may not lose more than 0.5% of the data of communications during a period of time between retuning such as 0.5% of the subframes of a radio frame or 0.5% of the subframes or uplink and/or downlink on PCell, SCell, and/or PSCell. In further embodiments, the UE is allowed an interruption of up to X subframes on primary cell (PCell) during the RRC reconfiguration procedure for both uplink and downlink of PCell, where X is a positive integer.

In other embodiments, during the initial connection with the base station 101, the UE-2 may signal to the base station 101 that the UE-2 does require measurement gaps to retune the RF chains. In response, the base station 101 may receive the signaling from the UE-2, determine a set of measurement gaps to assign to the UE-2, and transmit information about the set of measurement gaps to the UE-2. Thereafter, the base station 101 may observe RRM protocols related to the UE-2 during the measurement gaps and not expect receipt of communications from the UE-2 during the measurement gaps. Similarly, the baseband circuitry of the UE-2 may observe the RRM protocols related to the UE-2 during the measurement gaps. For the UE-2, the protocols may require that:

If the UE requires measurement gaps to identify and measure inter-frequency and/or inter-RAT cells, in order for the requirements in the following subsections to apply the E-UTRAN must provide a single measurement gap pattern with constant gap duration for concurrent monitoring of all frequency layers and RATs.

During the measurement gaps the UE:
  shall not transmit any data
  is not expected to tune its receiver on any of the E-UTRAN carrier frequencies of PCell and any SCell.
  is not expected to tune its receiver on any of the E-UTRAN carrier frequencies of PCell, PSCell, and SCell.

If the UE supporting dual connectivity is configured with PSCell, during the total interruption time, the UE shall not transmit and receive any data in SCG.

In the uplink subframe occurring immediately after the measurement gap,
  if the following conditions are met then it is up to UE implementation whether or not the UE can transmit data:
    all the serving cells belong to E-UTRAN TDD;
  if the subframe occurring immediately before the measurement gap is an uplink subframe.
Otherwise the UE shall not transmit any data.

In determining the above UE behavior in the uplink subframe occurring immediately after the measurement gap the UE shall treat a special subframe as an uplink subframe if the special subframe occurs immediately before the measurement gap, Inter-frequency and inter-RAT measurement requirements within this clause rely on the UE being configured with one measurement gap pattern unless the UE has signaled that it is capable of conducting such measurements without gaps. UEs shall only support those measurement gap patterns that are relevant to its measurement capabilities.

In present embodiment, the UE-3 supports carrier aggregation and non-stand-alone, dual connectivity and communicates with both the base station 101 and the base station 102. Carrier aggregation (CA) may allow the UE-3 to simultaneously transmit and receive data on multiple component carriers to and from the base station 101. Dual connectivity (DC) may allow the UE-3 to simultaneously transmit and receive data on multiple component carrier from two cell groups: the master cell group (MCG) and the secondary cell group (SCG). And non-stand-alone, dual connectivity may allow the UE-3 to simultaneously transmit and receive data on both the wide bandwidth component carrier and a different component carrier. Note that stand-alone, dual connectivity may allow the UEs to simultaneously transmit and receive data on either the wide bandwidth component carrier or a different component carrier.

During the initial connection, the UE-3 may transmit a frame that includes an indication of the capabilities of the UE-3 and may receive a synchronization signal for a wideband component carrier from the base station 101. In many embodiments, the UE-3 may indicate in an RRC layer capabilities information element that the UE-3 may require measurement gaps to retune RF chains.

The base station 101 may respond by transmitting an RRC layer, measurement gap configure information element to communicate a set of measurement gaps to the UE-3. In some embodiments, based on the capabilities, other information about the UE-3, load balancing considerations, and/or other considerations, the base station 101 may also provide a synchronization signal offset to the UE-3 to facilitate synchronization between the UE-3 and the base station 102. The offset may comprise a difference in phase between the component frequency of the communications with the base station 101 and the component frequency of the communications with the base station 102 to facilitate the dual connectivity capability of UE-3.

In some embodiments, the base station 101 may assign uniform measurement gaps to the UE-3 and, in other embodiments, the base station 101 may assign non-uniform measurement gaps to the UE-3. The base station 101 may determine the type of measurement gaps as well as the parameters of the measurement gaps based on the capabilities indicated by the UE-3. Note that while some discussions herein describe wide band or wide bandwidth channels, the embodiments equally apply to very wide band or very wide bandwidth channels.

FIG. 2 is a simplified block diagram 200 of a base station 201 and a user equipment (UE) 211 that may carry out certain embodiments of the present invention in a communication network such as the base station 101, the UEs, and communication network 120 shown in FIG. 1. For the base station 201, the antenna 221 transmits and receives radio signals. The RF circuitry 208, coupled with the antenna 221, receives RF signals from the antenna 231, converts the signals to digital baseband signals and sends them to the processor 203 of the baseband circuitry 251. The RF circuitry 208 also converts received, digital baseband signals from the processor 203, converts them to RF signals, and sends out to antenna 221.

The processor 203 processes the received baseband signals and invokes different functional modules to perform features in the base station 201. The memory 202 stores program instructions or code and data 209 to control the operations of the base station. The processor 203 may also execute code such as RRC layer code from the code and data 209 to configure and implement the gap manager 235 to manage communications with UEs that receive and implement a gap pattern in accordance with a measurement gap protocol.

The RRC layer code, when executed on a processor such as the processor 203, may determine if the UE 211 requires measurement gaps based on capabilities that the UE 211 transmits to the base station 201. If the RRC layer code determines that the UE 211 requires measurement gaps, the RRC layer code may look-up a gap pattern for the UE 211 based on capabilities indicated by the UE 211 in a table such as the table 6400 for non-uniform gap patterns illustrated in FIG. 6E or the table 6500 for uniform gap patterns in FIG. 6F.

After identifying a gap pattern for the UE 211, the RRC layer code may transmit an information element to the UE 211 that includes information describing the gap pattern. Thereafter, the gap manager 235 may enforce radio resource management (RRM) protocols such as when the UE 211 is not expected to transmit any data or tune its receiver to any of the E-UTRAN carrier frequencies such as component carrier frequencies of the PCell, the PSCell, and the SCell. For instance, during a measurement gap, the gap manager 235 may not schedule traffic data, or may delay scheduling traffic data, received for transmission to the UE 211 until a subframe after the measurement gap such as a first downlink subframe immediately after the end of the measurement gap.

In some embodiments, the base station 201 may communicate with a secondary base station that communicates with the UE 211, information about an assignment for measurement gap to the UE 211 so that a gap manager of the secondary base station may enforce RRM protocols related to measurement gaps for the UE 211. In other embodiments, the performance of a measurement gap by the UE 211 appears as an interruption in communications to a secondary base station associated with the UE 211.

A similar configuration exists in UE 211 where the antenna 231 transmits and receives RF signals. The RF circuitry 218, coupled with the antenna, receives RF signals from the antenna 221, converts them to baseband signals and sends them to processor 213 of the baseband circuitry 261. The RF transceiver 218 also converts received baseband signals from the processor 213, converts them to RF signals, and sends out to the antenna 231.

The RF circuitry 218 illustrates multiple RF chains. While the RF circuitry 218 illustrates five RF chains, each UE may have a different number of RF chains and each of the RF chains in the illustration may represent multiple, time domain, receive (RX) chains and transmit (TX) chains. The RX chains and TX chains include circuitry that may operate on or modify the time domain signals transmitted through the time domain chains such as circuitry to insert guard intervals in the TX chains and circuitry to remove guard intervals in the RX chains. For instance, the RF circuitry 218 may include transmitter circuitry and receiver circuitry, which is often called transceiver circuitry. The transmitter circuitry may prepare digital data from the processor 213 for transmission through the antenna 231. In preparation for transmission, the transmitter may encode the data, and modulate the encoded data, and form the modulated, encoded data into Orthogonal Frequency Division Multiplex (OFDM) and/or Orthogonal Frequency Division Multiple Access (OFDMA) symbols. Thereafter, the transmitter may convert the symbols from the frequency domain into the time domain for input into the TX chains. The TX chains may include a chain per subcarrier of the bandwidth of the RF chain and may operate on the time domain signals in the TX chains to prepare them for transmission on the component subcarrier of the RF chain. For wide bandwidth communications, more than one of the RF chains may process the symbols representing the data from the baseband processor(s) simultaneously.

The processor 213 processes the received baseband signals and invokes different functional modules to perform features in the UE 211. The memory 212 stores program instructions or code and data 219 to control the operations of the UE 211. The processor 213 may also execute medium access control (MAC) layer code of the code and data 219 to enforce interruption requirements. For instance, if the UE 211 performs retuning without using measurement gaps, the MAC layer code may execute on the processor 213 to perform measurements on signals and to perform retuning of one or more of the RF chains via the physical layer (PHY), which is the RF circuitry 218 and associated logic such as the functional module, tune/retune 240. In such embodiments, the MAC layer code may complete the measurement and retuning within the interruption requirement and may then resume communications via the corresponding one or more RF chains.

For embodiments in which the UE 211 combines more than one RF chains to form a wide bandwidth or very wide bandwidth communication channel or includes a wide bandwidth RF chain and/or a very wide bandwidth RF chain to form a wide bandwidth or very wide bandwidth communication, the MAC layer code may execute on the processor 213 to configure and implement the tune/retune 240 to enforce protocols related to measurement gaps. For instance, the protocols may relate to timing for performing measurements and for retuning one or more RF chains. The protocols may also include rules related to when the UE 211 is expected to be available to transmit and receive communications and when the UE 211 is not expected to be available to transmit or receive.

To illustrate for E-UTRAN FDD intra frequency measurements, the UE 211 may be able to identify new intra-frequency cells and perform RSRP, RSRQ, and RS-SINR measurements of identified intra-frequency cells without an explicit intra-frequency neighbour cell list containing physical layer cell identities. During the RRC_CONNECTED state the UE 211 may continuously measure identified intra frequency cells and additionally search for and identify new intra frequency cells. Furthermore, in the RRC_CONNECTED state, the measurement period for intra frequency measurements may be, e.g., 200 milliseconds (ms). When no measurement gaps are activated, the UE 211 may be capable of performing RSRP, RSRQ, and RS-SINR measurements for 8 identified-intra-frequency cells, and the UE 211 physical layer may be capable of reporting measurements to higher layers with the measurement period of, e.g., 200 ms. When measurement gaps are activated, including nonuniform gaps, the UE 211 may be capable of performing measurements for at least a particular number of cells. If the UE 211 has identified more than the particular number of cells, the UE 211 may perform measurements of at least 8 identified intra-frequency cells but the reporting rate of RSRP, RSRQ, and RS-SINR measurements of cells from UE 211 physical layer to higher layers may be decreased.

The base station 201 and the UE 211 may also include several functional modules and circuits to carry out some embodiments of the present invention. The different functional modules may include circuits or circuitry that code, hardware, or any combination thereof, can configure and implement. For example, the processor 203 (e.g., via executing program code 209) may configure and implement the circuitry of the functional modules to allow the base station 201 to schedule (via scheduler 204), encode (via codec 205), modulate (via modulator 206), and transmit control information and data (via control circuit 207) to the UE 211.

The processor 213 (e.g., via executing program code 219) may configure and implement the circuitry of the functional modules to allow the UE 211 to receive, de-modulate (via de-modulator 216), and decode (via codec 215) the control information and data (via control circuit 217) accordingly with an interference cancellation (IC 214) capability.

Figure 3:
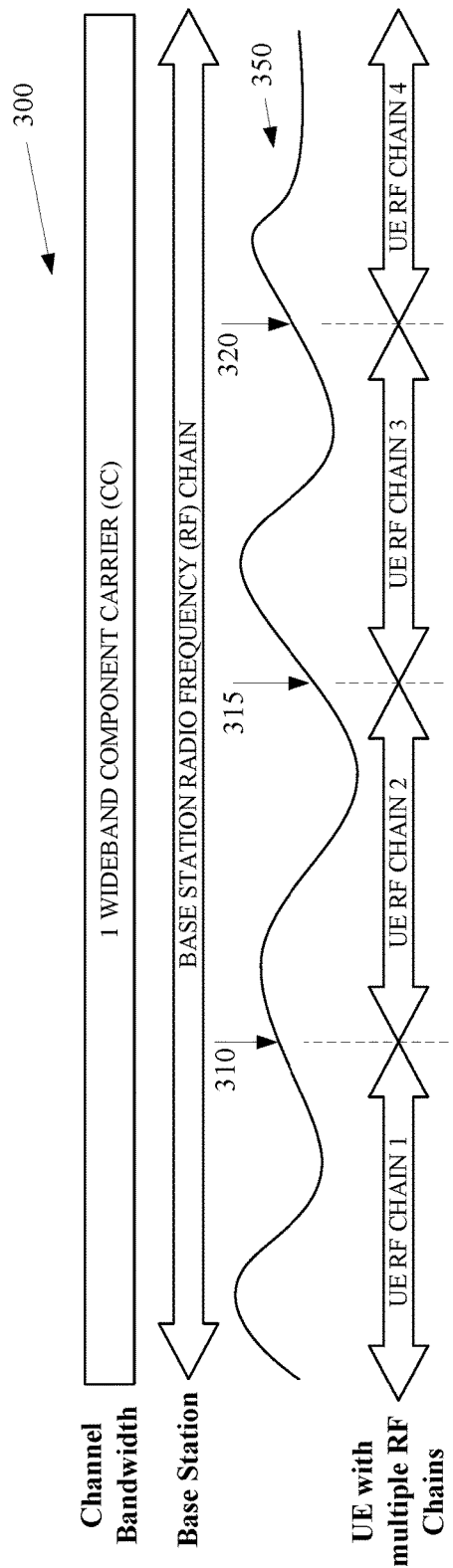
FIG. 3 depicts an embodiment of a communication represented by a slice of a time domain signal transmitted at time, t1, on a wide bandwidth channel of a component carrier from user equipment to a base station, such as the base station and user equipment shown in FIGS. 1 and 2.

FIG. 3 depicts an embodiment 300 of a communication from a UE to a base station represented by a slice 350 of a time domain signal transmitted at time, t1, on a wide bandwidth channel of a component carrier from user equipment to a base station, such as the base station and user equipment shown in FIGS. 1 and 2. In the present embodiment, the UE comprises a baseband processor and PHY that is capable of synchronizing more than one RF chains based on the single, synchronization signal transmitted by the base station at the middle of the wide bandwidth. This process requires the baseband circuitry and PHY, such as the tune/retune 240 functional module shown in FIG. 2, to retune each of the carrier frequencies of the multiple RF chains to a frequencies that align the subcarriers of each RF chain with the subcarriers of each contiguous RF chain. The slice 350 shows the transmission from the UE RF chains via an antenna at time, t1. The slice 350 is the amplitude of each of multiple subcarriers on which UE RF chains 1-4 transmit symbols such as OFDM symbols on a CC that may be below 6 GHz, between 6 GHz and 24 GHz, or above 24 GHz.

The arrows 310, 315, and 320 illustrate the contiguous nature of the slice between RF chains 1 and 2, 2 and 3, and 3 and 4, respectively. At these arrows 310, 315, and 320, the subcarriers of the respective RF chains line up nearly perfectly in terms of timing synchronization and frequency synchronization such that the RF chains (Rx and Tx chains) will not require retuning. Furthermore, the UE may be allowed an interruption of up to X subframes on the PCell for both uplink and downlink, where X is a positive integer, or a percentage of subframes with respect to the total number of subframes in a radio frame. In such embodiments, the UE may indicate that the UE does not require the use of, or lacks a requirement for, measurement gaps to meet the interruption requirement of the RRM.

Figure 4:
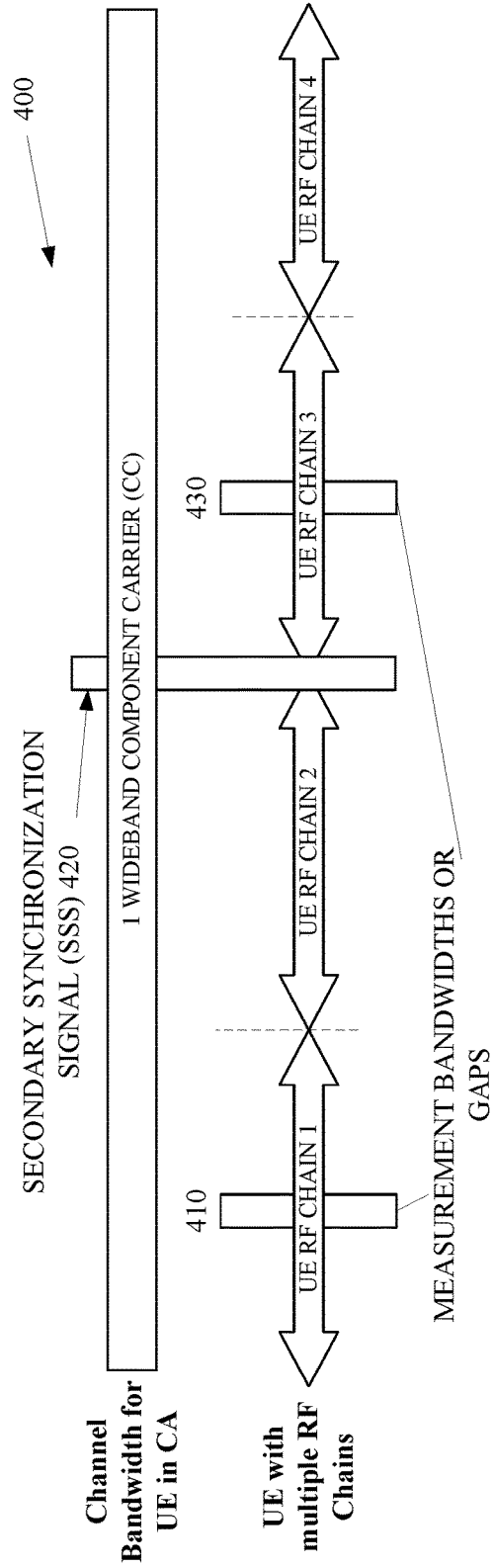
FIG. 4 depicts an embodiment of synchronization with a synchronization signal transmitted on a wide bandwidth channel of a component carrier at the center of the wide bandwidth as well as retuning by the user equipment, such as the user equipment shown in FIGS. 1 and 2.

FIG. 4 depicts an embodiment 400 of a synchronization with a synchronization signal transmitted on a wide bandwidth channel of a component carrier at the center of the wide bandwidth as well as retuning by the user equipment, such as the user equipment shown in FIGS. 1 and 2. In the present embodiment, the base station transmits a secondary synchronization signal 420 at the center of the wide bandwidth for communication with the base station. The UE may synchronize each of multiple RF chains with the secondary synchronization signal 420 and may then require that the RF chains be retuned. The solution herein is for the baseband circuitry and the PHY, such as the tune/retune 240 functional module shown in FIG. 2, to retune the RF chains as necessary without violating the interruption requirement of the RRM. In some embodiments, the original tuning based on the secondary synchronization signal may be close but leaving a small number of RF chains, such as less than all the RF chains, to retune at the measurement bandwidths 410 and 430. In such embodiments, the UE may transmit signaling to the base station to indicate that the UE does not require, or lacks a requirement for, measurement gaps.

In other embodiments, the UE may request measurement gaps and may measure and retune based on the gaps 410 and 430. In such embodiments, the UE may transmit signaling to the base station to indicate that the UE does require measurement gaps and the base station may transmit information about a set of gaps 410 and 430.

Figure 5:
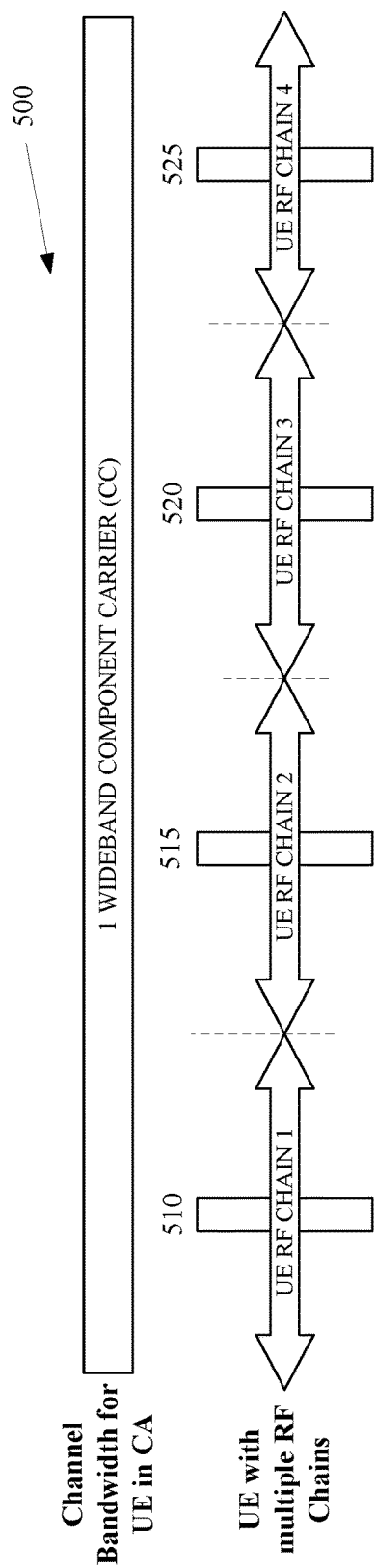
FIG. 5 depicts an embodiment of a base station that accommodates the formation of a wide bandwidth by a UE by aggregating multiple RF chains by transmission of multiple synchronization signals, such as the base station and user equipment shown in FIGS. 1 and 2.

FIG. 5 depicts an embodiment of a base station that accommodates the formation of a wide bandwidth by a UE by aggregating multiple RF chains by transmission of multiple synchronization signals, such as the base station and user equipment shown in FIGS. 1 and 2. In this embodiment, the UE will tune each of more than one RF chains 1-4 based on individual synchronization signals 510, 515, 520, and 525, respectively. The base station determines the synchronization signals required for each of the RF chains in the UE and transmits the appropriate synchronization signals. In such embodiments, the UE will not have to retune because the measurement of a local synchronization signal, i.e., within a wide or narrow bandwidth of the RF chain, may address and compensate for issues such as fading channel. In such embodiments, the UE may transmit signaling that includes capabilities of the UE in an RRC layer information element to the base station to inform the base station that the UE does not require measurement gaps.

Figure 6A:
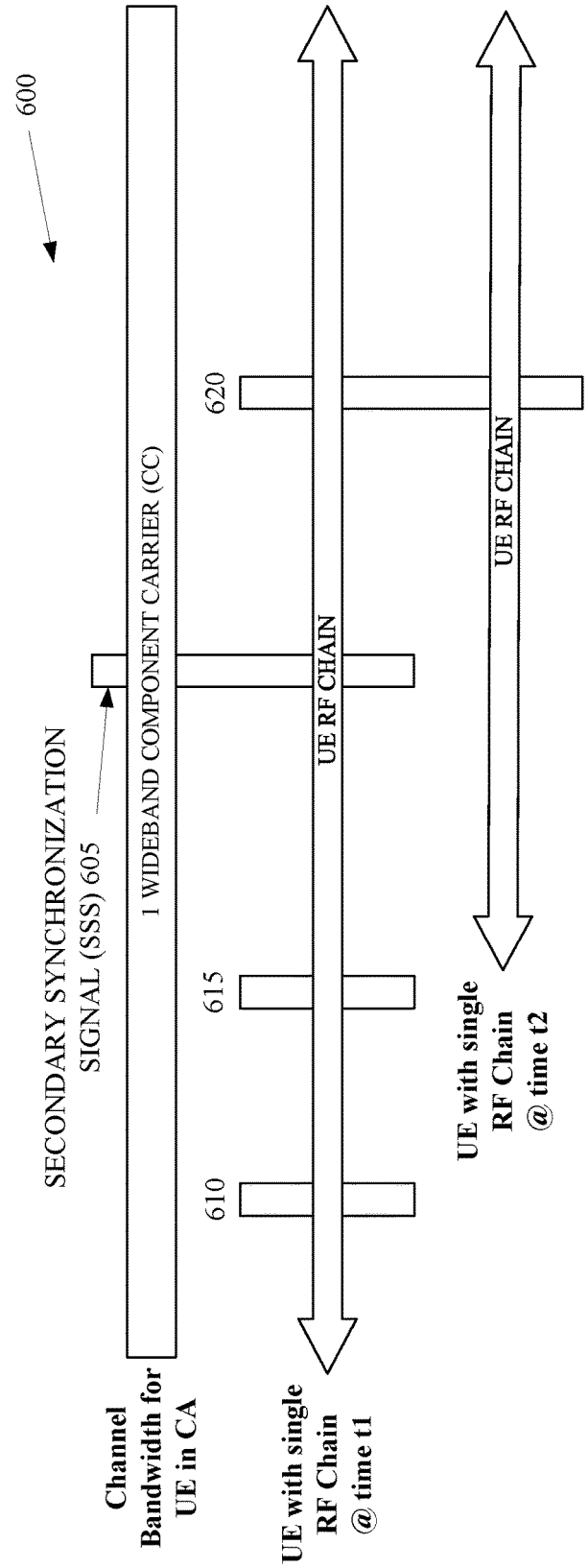
FIG. 6A depicts an embodiment of user equipment that uses a single, wide bandwidth RF chain for wide bandwidth communications with a base station and retunes with uniform or non-uniform measurement gaps, such as the base station and user equipment shown in FIGS. 1 and 2.

FIG. 6A depicts an embodiment of user equipment that uses a single RF chain for wide bandwidth communications with a base station and retunes with uniform or non-uniform measurement gaps, such as the base station and user equipment shown in FIGS. 1 and 2. The base station may transmit a secondary synchronization signal (SSS) 605 to the UE to facilitate an initial synchronization of the single, wide bandwidth RF chain in the UE. Due to effects such as fading channel, the measurement of the SSS 605 at the center of the wide bandwidth is not sufficient to accurately synchronize the single, wide bandwidth RF chain. The UE indicates to the base station in a capabilities information element that the UE does require measurement gaps. In response, the RRM of the base station may determine a gap pattern to assign to the UE based on the capabilities of the UE and then may transmit information about the gap pattern to the UE.

The gap pattern may include uniform, periodic measurement gaps that have a constant measurement gap length (MGL) in e.g., milliseconds, and have a constant measurement gap repetition period (MGRP) in, e.g., milliseconds, such as the measurement gaps illustrated in the table 6500 in FIG. 6F. In several embodiments, each set of measurement gaps, or gap patterns, in the table 6500 may include a gap pattern index. In some embodiments, the base station may maintain a list or table with information in the table 6500 or similar to the information included in the table 6500 to determine which gap pattern to assign to the UE. For instance, the gap patterns in table 6500 are also associated with a measurement purpose. The measurement purpose may list communication capabilities and the base station may choose the measurement purpose that most closely matches the capabilities of the UE to select a gap pattern for the UE.

In some embodiments, the gap patterns may also include non-uniform gap patterns such as the non-uniform gap patterns illustrated in FIGS. 6D and 6E. The table 6400 defines non-uniform gap patterns by a gap pattern ID, an MGL in milliseconds, an MGRP in milliseconds, a number of gaps per burst, a burst repetition period (Tburst), and a measurement purpose.

After the base station assigns the gaps 610, 615, 620, and 625 to the UE, the UE may perform measurements and retuning during each of the gaps 610, 615, 620, and 625 via baseband circuitry and PHY such as the tune/retune 240 functional module shown in FIG. 2.

The FIG. 6A illustrates the measurement gaps 610 and 615 during the time t1 and the measurement gap 620 during the time t2 to illustrate the periodic nature of the measurement gap pattern for the measurement gaps 610, 615, and 620.

FIGS. 6B-C depict embodiments of uniform or non-uniform measurement gaps and interruption time measurement in synchronous and asynchronous, dual connectivity for both primary cell groups and secondary cell groups for user equipment, such as the user equipment shown in FIGS. 1 and 2. In particular, FIG. 6B illustrates communications 6100 of a UE with synchronous, dual connectivity. The communications include nine subframes (i through i+8) of a primary cell group (PCG) 6110 and nine subframes (j through j+8) of a secondary cell group (SCG) 6120. The synchronous aspect of the dual connectivity aligns the borders of each of the subframes in the PCG 6110 and the SCG 6120. Thus, when performing a measurement gap having a duration of six subframes in the PCG 6110, the interruption time in communication with the secondary base station associated with the SCG 6120, is the duration of the measurement gap, i.e., the duration of transmission or reception of six subframes.

For synchronous, dual connectivity as shown in FIG. 6B, subframe j is regarded as the subframe occurring immediately before the measurement gap for PCG 6110 and SCG 6120. Similarly, subframe j+7 is regarded as the subframe occurring immediately after the measurement gap for PCG 6110 and SCG 6120. Note also that the number of subframes in a radio frame depends on the bandwidth of the channel.

FIG. 6C illustrates communications 6200 of a UE with asynchronous, dual connectivity. The communications include nine subframes (i through i+8) of a primary cell group (PCG) 6210 and nine subframes (j through j+8) of a secondary cell group (SCG) 6220. The asynchronous aspect of the dual connectivity misaligns the borders of each of the subframes in the PCG 6210 and the SCG 6220. Thus, when performing a measurement gap having a duration of six subframes in the PCG 6210, the interruption time in communication with the secondary base station associated with the SCG 6220, is the duration of the measurement gap plus subframe j+7, i.e., the duration of transmission or reception of seven subframes due to the partial overlap of the seventh subframe by the measurement gap in the SCG 6220.

For asynchronous, dual connectivity as shown in FIG. 6C, subframe j is regarded as the subframe occurring immediately before the measurement gap for SCG 6220. Similarly, subframe j+8 is regarded as the subframe occurring immediately after the measurement gap for SCG 6220.

Referring now to FIGS. 6D-6E, FIG. 6D depicts an embodiment 6300 of non-uniform measurement gaps for user equipment, such as the user equipment shown in FIGS. 1 and 2, and FIG. 6E depicts an embodiment of a table 6400 of non-uniform measurement gaps for user equipment indexed by a Gap Pattern identifier (ID) such as the non-uniform gaps illustrated in FIG. 6D. In FIGS. 6D-6E, the measurement gap length (MGL) illustrates the duration of a measurement gap in milliseconds. The measurement gap repetition period (MGRP) illustrates the periodic repetition of the measurement gaps in milliseconds. The length of the MGRP (LMGRP) is the length or number of gaps in a burst of measurement gaps. Tburst is the period between measurement gaps bursts. T1 is the number of measurement gaps in the burst of measurement gaps during which the UE is expected to measure and retune. And T2 is the number of measurement gaps during a bust of measurement gaps that are not recognized as measurement gaps by the UE and by the base station.

The table 6400 of FIG. 6E shows the measurement gap patterns (or sets of measurement gaps) for nonUniform1-nonUniform4 gap IDs. A burst repetition period Tburst comprises T1 and T2. During T1, the UE performs measurement during the measurement gap. During T2, the UE suspends the measurement gap protocol. Both the UE and the base station can assume there are no measurement gaps during T2. T1 equals to number of gaps per burst in the table 6400 and Tburst is configured by the higher software layers, i.e., layers above the RRC layer.

For nonUniform1-nonUniform4 the total interruption time on SCG is same as for Gap Pattern ID 0 (GP0) and Gap Pattern ID 1 (GP1) shown in table 6500 in FIG. 6F for both synchronous and asynchronous dual connectivity as shown in FIGS. 6B and 6C.

Figure 7A:
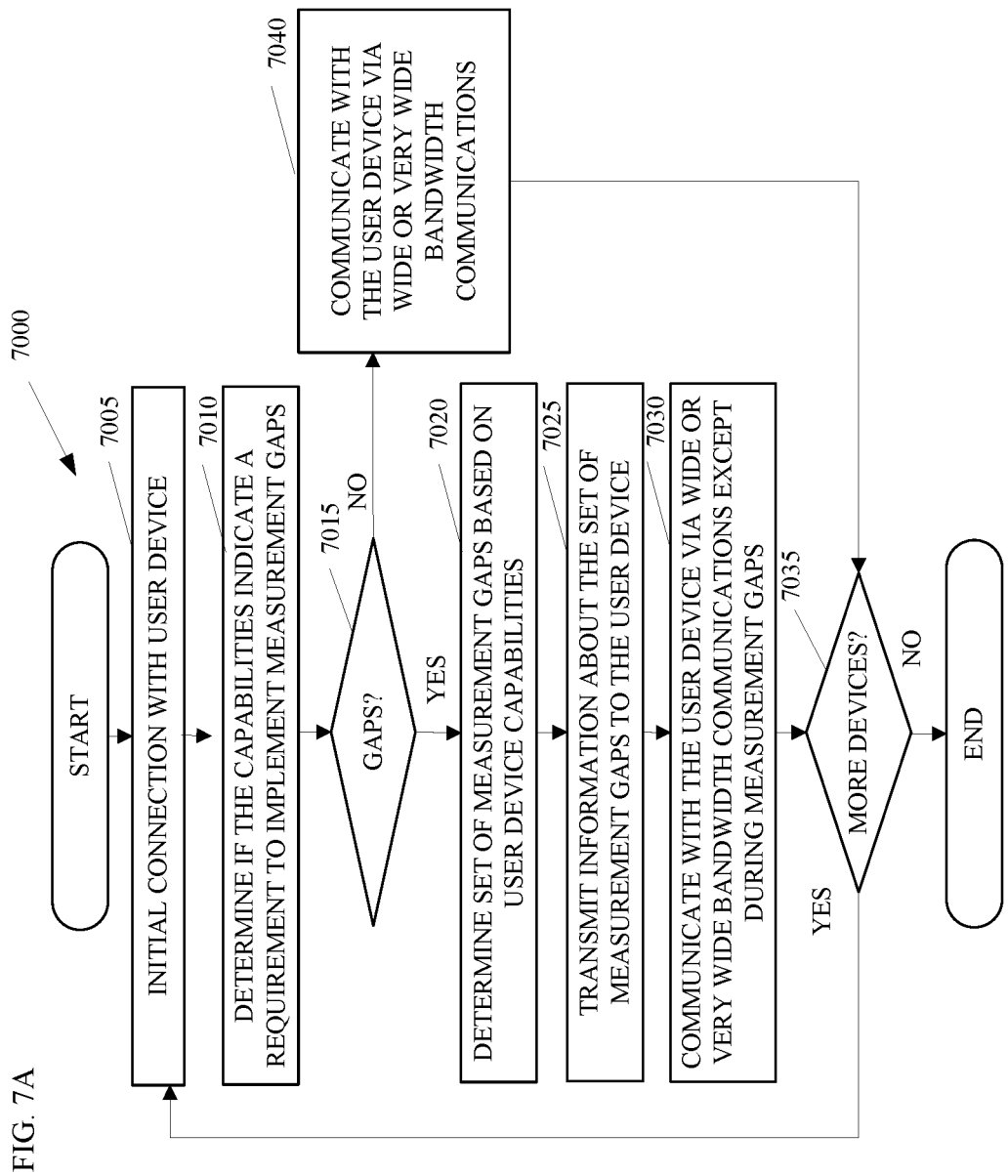
FIGS. 7A-B depict flowcharts of embodiments to communicate via a wide or very wide bandwidth communication channel such as the communication channels illustrated in FIGS. 3-5 and 6A.
Figure 7B:
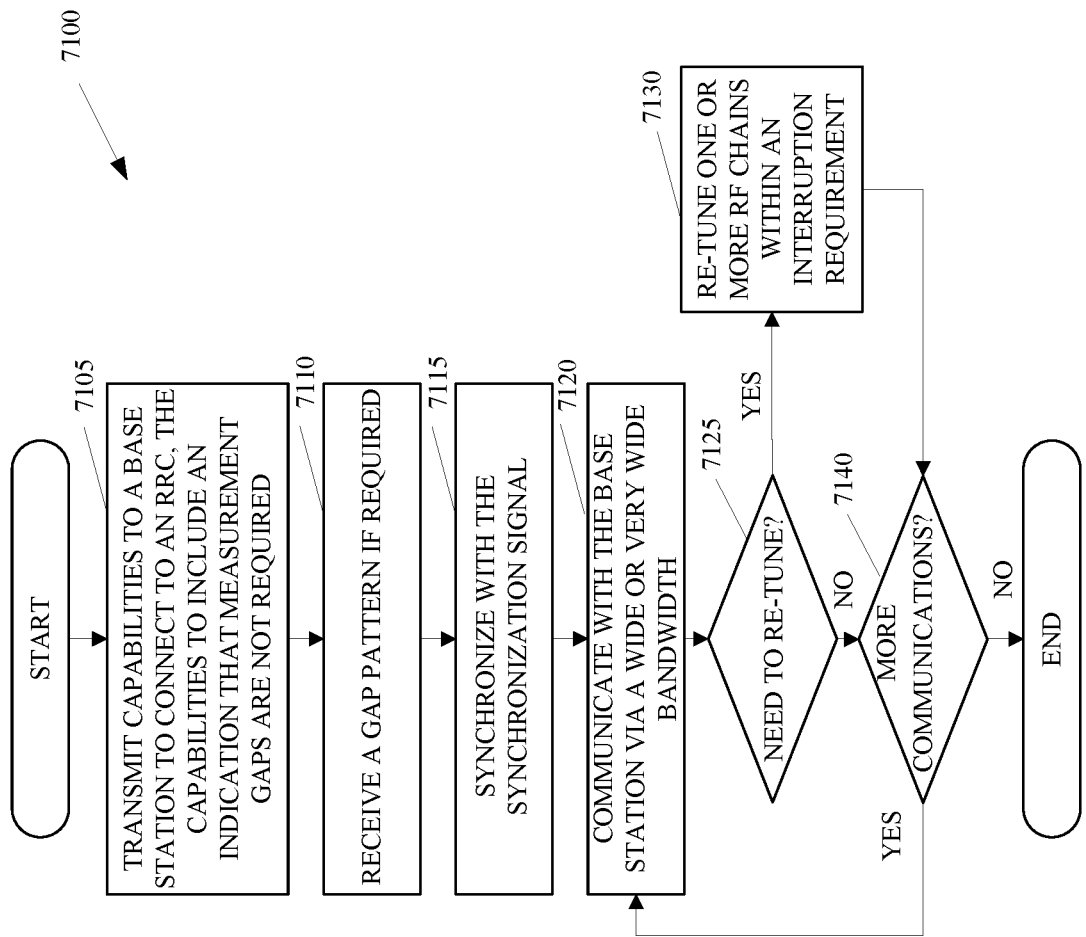

FIGS. 7A-B depict flowcharts of embodiments communicate via a wide or very wide bandwidth communication channel such as the communication channels illustrated in FIGS. 3-5 and 6A. FIG. 7A illustrates an embodiment of a flowchart 7000 to establish communications between a base station and a user device such the base station and user equipment, respectively, illustrated in FIGS. 1-2. At the beginning of the flowchart 7000, the base station may form an initial connection with the user device (element 7005). For example, the user device may transmit a request to establish a connection to the base station such as an initial communication to connect to the RRC layer of the base station and the base station may transmit a synchronization signal to the user device so the user device can measure the synchronization signal and synchronize to a wide or very wide bandwidth channel. In some embodiments, the user device may synchronize multiple RF chains to support wide or very wide bandwidth communications. In other embodiments, the user device may comprise a wide or very wide bandwidth RF chain to support wide or very wide bandwidth communications.

In many embodiments, the user device may also transmit an RRC layer information element that includes information about the capabilities of the user device. The information about the capabilities may include information to indicate if the user device requires measurement gaps.

The base station may receive the information about the capabilities of the user device and parse the capabilities to determine if the user device requires measurement gaps (element 7010). When the capabilities indicate that the user does not require measurement gaps (element 7015), the base station may establish communications with the user device via the wide or very wide bandwidth channel (element 7040) without implementing measurement gap protocols.

On the other hand, if the user device does require measurement gaps, the base station may determine a set of measurement gaps, or a measurement gap pattern, to assign to the user device based on the capabilities indicated by the user device (element 7020). For example, the base station may store, in memory, a table or other data structure that associates capabilities of the user device and measurement gap patterns such as the table 6400 illustrated in FIG. 6E and the table 6500 in FIG. 6F. The base station may compare the communication capabilities of the user device such as inter-frequency E-UTRAN FDD and TDD, UTRAN FDD, GSM EDGE Radio Access Network (GERAN), Least Cost Routing (LCR), TDD, HRPD, CDMA2000 1×, inter-frequency New Radio (NR), inter-RAT NR, and/or the like, against the measurement purpose of the each of the measurement gap patterns to determine which pattern(s) match and may also select between the matching patterns based on other criteria.

Once the base station determines or selects a measurement gap pattern, the base station may transmit information about the measurement gap pattern to the user device (element 7025) and associate the user device with a measurement gap protocol. The base station may then communicate with the user device via the wide or very wide bandwidth channel but follow the measurement gap protocol to avoid transmitting data to or expecting data to be received from the user device during the measurement gaps (element 7030).

After establishing communications with the user device, the base station may establish connections with additional devices if more devices are transmitting connection requests (element 7035). Otherwise, the flowchart 7000 ends until another user device requests a connection.

FIG. 7B illustrates an embodiment of a flowchart 7100 for user device to establish connection with a base station such as the user equipment (UE) and base station in FIGS. 1-2. The flowchart 7100 begins with the user device transmitting a communication from an RRC layer of the user device to an RRC layer of the base station, which includes an information element to describe the capabilities of the user device (element 7105). The capabilities may include a bit that, when set, indicates that the user device does require measurement gaps to facilitate adherence to an interruption requirement. When the bit is not set, the information element for the capabilities may indicate that the user device does not require measurement gaps. In other embodiments, setting the bit may indicate the user device does not require measurement gaps and not setting the bit may indicate that the user device does require measurement gaps. In still other embodiments, the UE may transmit a communication that indicates capabilities of the user device such as a UE.

When the capabilities of the user device indicate that the user device requires measurement gaps, the user device may receive the gap pattern (element 7110) and the user device may accept measurement gaps that the user device supports. On the other hand, when the capabilities of the user device indicate that the user device does not require measurement gaps, the user device may not receive the set of measurement gaps from the base station.

The user device may receive from the base station, in response to the communication, a synchronization signal or set of synchronization signals. The user device may take measurements of the synchronization signal(s) and synchronize a wide or very wide bandwidth communications interface based on the synchronization signal(s) (element 7115). For example, the user device may take measurements of the synchronization signal and determine qualities associated with the received signal such as the carrier frequency, weights to adjust the amplification of tones on each of the subcarriers in the synchronization signal and phase shifts to adjust the phase of the tones on each of the subcarriers. For some user devices, the measurement and synchronization with the synchronization signal may not be sufficient to accurately synchronize all the subcarriers of a wide bandwidth or very wide bandwidth communications channel.

After establishing a connection with the base station and synchronizing with the synchronization signal(s), the user device may communicate with the base station (element 7120). If the user device requires measurement gaps, the user device will need to re-tune one or more RF chains of the user device (element 7120). Such user devices may periodically pause communications with the base station and possibly other devices to measure and re-tune one or more RF chains of the user device (element 7130).

If the user device does not require measurement gaps, the user device may have more accurately measured the synchronization signal(s) but may still require to retune one or more RF chains used to form the wide or very wide bandwidth communications channel. In such embodiments, the user device may include a tune/retune functional module such as the tune/retune 240 functional module shown in FIG. 2 to retune one or more of the RF chains within an interruption requirement for communication with the base station (element 7130). For instance, the user device may include a multiple, narrow bandwidth RF chains that combine via carrier aggregation to form a contiguous bandwidth for communications via the wide or very wide bandwidth channel. The user device may retune the multiple, narrow bandwidth RF chains to update weights and phase adjustments for one or more of the subcarriers of the multiple, narrow bandwidth RF chains.

After retuning, if necessary or if assigned measurement gaps, the user device may continue to communicate by transmitting and receiving communications via the wide or very wide bandwidth channel starting with a subframe immediately following the measurement gap.

Figure 8:
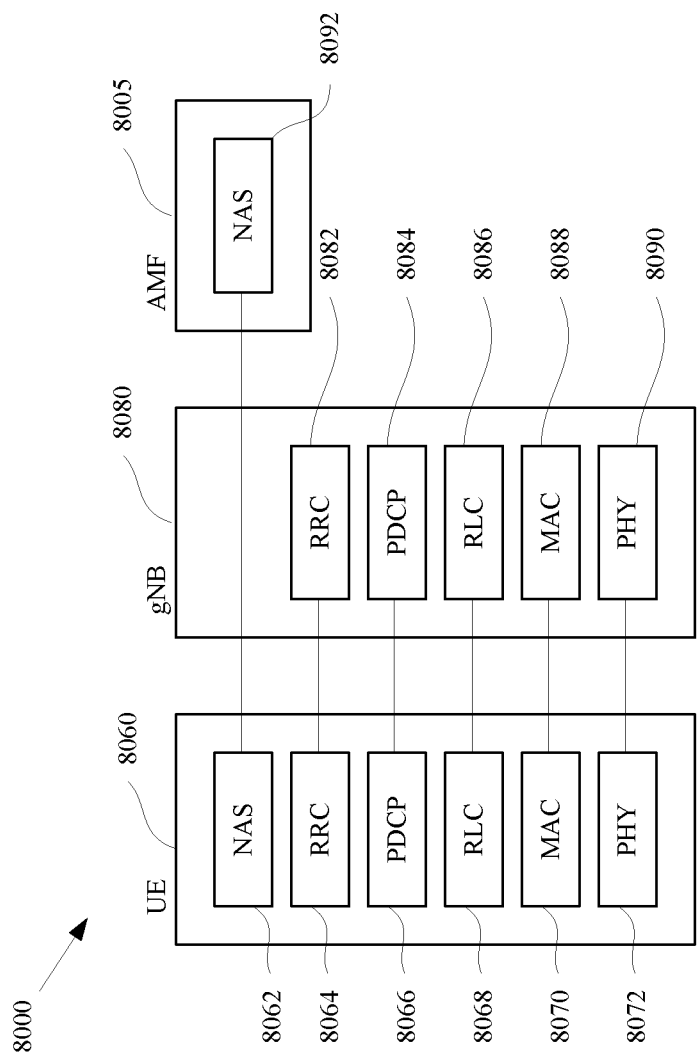
FIG. 8 depicts an embodiment of protocol entities in wireless communication devices such as the base station and user equipment shown in FIGS. 1-2.

FIG. 8 depicts an embodiment of protocol entities 8000 that may be implemented in wireless communication devices, including one or more of a user equipment (UE) 8060, a base station, which may be termed an evolved node B (eNB), or new radio node B (gNB) 8080, and a network function, which may be termed a mobility management entity (MME), or an access and mobility management function (AMF) 8094, according to some aspects.

According to some aspects, gNB 8080 may be implemented as one or more of a dedicated physical device such as a macro-cell, a femto-cell or other suitable device, or in an alternative aspect, may be implemented as one or more software entities running on server computers as part of a virtual network termed a cloud radio access network (CRAN).

According to some aspects, one or more protocol entities that may be implemented in one or more of UE 8060, gNB 8080 and AMF 8094, may be described as implementing all or part of a protocol stack in which the layers are considered to be ordered from lowest to highest in the order physical layer (PHY), medium access control (MAC), radio link control (RLC), packet data convergence protocol (PDCP), radio resource control (RRC) and non-access stratum (NAS). According to some aspects, one or more protocol entities that may be implemented in one or more of UE 8060, gNB 8080 and AMF 8094, may communicate with a respective peer protocol entity that may be implemented on another device, using the services of respective lower layer protocol entities to perform such communication.

According to some aspects, UE PHY 8072 and peer entity gNB PHY 8090 may communicate using signals transmitted and received via a wireless medium. According to some aspects, UE MAC 8070 and peer entity gNB MAC 8088 may communicate using the services provided respectively by UE PHY 872 and gNB PHY 8090. According to some aspects, UE RLC 8068 and peer entity gNB RLC 8086 may communicate using the services provided respectively by UE MAC 8070 and gNB MAC 8088. According to some aspects, UE PDCP 8066 and peer entity gNB PDCP 8084 may communicate using the services provided respectively by UE RLC 8068 and 5GNB RLC 8086. According to some aspects, UE RRC 8064 and gNB RRC 8082 may communicate using the services provided respectively by UE PDCP 8066 and gNB PDCP 8084. According to some aspects, UE NAS 8062 and AMF NAS 8092 may communicate using the services provided respectively by UE RRC 8064 and gNB RRC 8082.

Figure 9:
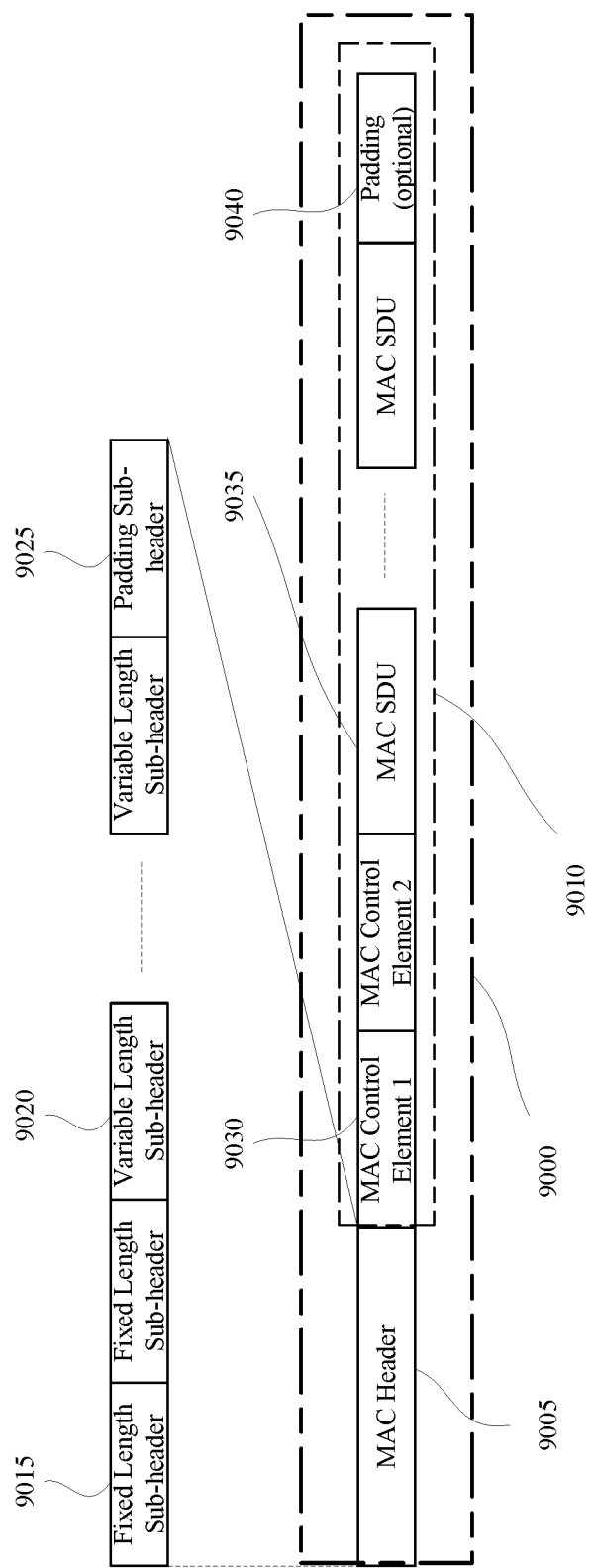
FIG. 9 depicts embodiments of the formats of physical layer data units (PDUs) that form via baseband circuitry and RF transceiver circuitry such as the baseband circuitry and the RF transceivers in FIG. 2.
Figure 13:
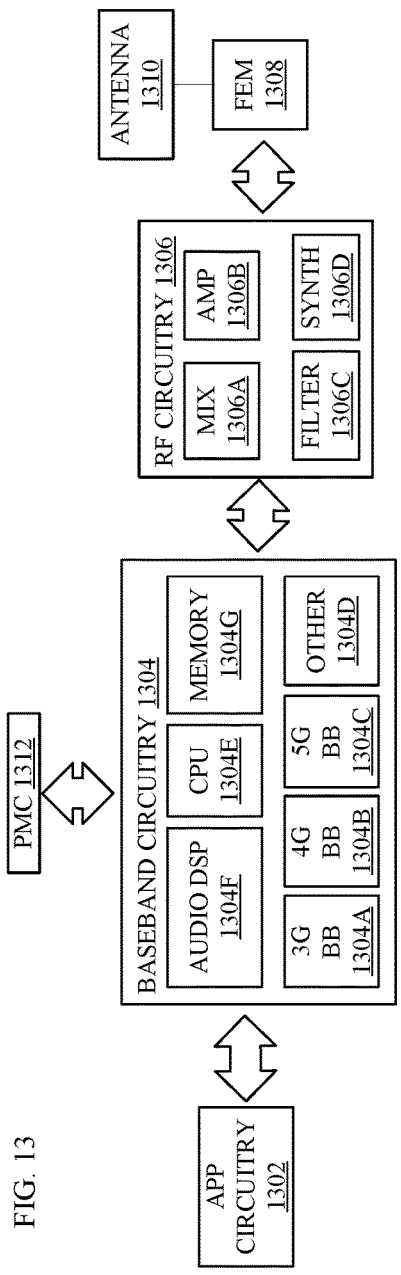
FIG. 13 depicts an embodiment of a device such as a base station or user equipment shown in FIGS. 1-2.
Figure 14:
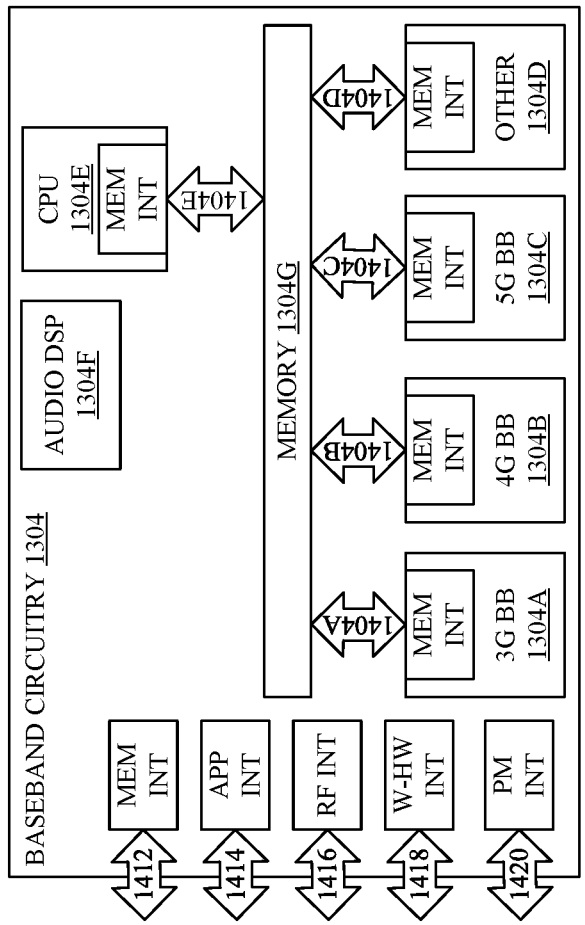
FIG. 14 depicts an embodiment of interfaces of baseband circuitry such as the baseband circuitry in FIG. 2.

FIG. 9 illustrates embodiments of the formats of PHY data units (PDUs) that may transmitted by the PHY device via one or more antennas and be encoded and decoded by a MAC entity such as the processors 203 and 213 in FIG. 2, the baseband module 1304 in FIGS. 13 and 14 according to some aspects. In several embodiments, higher layer frames such as a frame comprising an RRC layer information element may transmit from the base station to the UE or vice versa as one or more MAC Service Data Units (MSDUs) in a payload of one or more PDUs in one or more subframes of a radio frame.

According to some aspects, a MAC PDU 9100 may consist of a MAC header 9105 and a MAC payload 9110, the MAC payload consisting of zero or more MAC control elements 9130, zero or more MAC service data unit (SDU) portions 9135 and zero or one padding portion 9140. According to some aspects, MAC header 8105 may consist of one or more MAC sub-headers, each of which may correspond to a MAC payload portion and appear in corresponding order. According to some aspects, each of the zero or more MAC control elements 9130 contained in MAC payload 9110 may correspond to a fixed length sub-header 9115 contained in MAC header 9105. According to some aspects, each of the zero or more MAC SDU portions 9135 contained in MAC payload 9110 may correspond to a variable length sub-header 9120 contained in MAC header 8105. According to some aspects, padding portion 9140 contained in MAC payload 9110 may correspond to a padding sub-header 9125 contained in MAC header 9105.

Figure 10A:
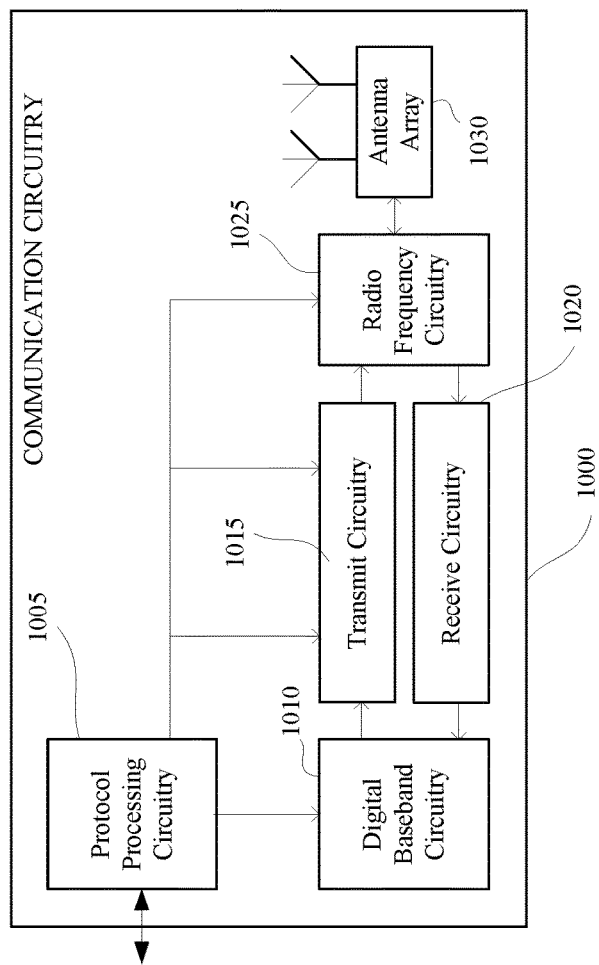
FIGS. 10A-B depicts embodiments of communication circuitry such as the components and modules shown in the user equipment and base station in FIG. 2.

FIG. 10A illustrates an embodiment of communication circuitry 1000 such as the circuitry in the base station 201 and the user equipment 211 shown in FIG. 2. The communication circuitry 1000 is alternatively grouped according to functions. Components as shown in the communication circuitry 1000 are shown here for illustrative purposes and may include other components not shown here in FIG. 10A.

The communication circuitry 1000 may include protocol processing circuitry 1005, which may implement one or more of medium access control (MAC), radio link control (RLC), packet data convergence protocol (PDCP), radio resource control (RRC) and non-access stratum (NAS) functions. The protocol processing circuitry 1005 may include one or more processing cores (not shown) to execute instructions and one or more memory structures (not shown) to store program and data information.

The communication circuitry 1000 may further include digital baseband circuitry 1010, which may implement physical layer (PHY) functions including one or more of hybrid automatic repeat request (HARQ) functions, scrambling and/or descrambling, coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, and other related functions.

The communication circuitry 1000 may further include transmit circuitry 1015, receive circuitry 1020 and/or antenna array circuitry 1030.

The communication circuitry 1000 may further include radio frequency (RF) circuitry 1025. In an aspect of the invention, RF circuitry 1025 may include multiple parallel RF chains for one or more of transmit or receive functions, each connected to one or more antennas of the antenna array 1030.

In an aspect of the disclosure, the protocol processing circuitry 1005 may include one or more instances of control circuitry (not shown) to provide control functions for one or more of digital baseband circuitry 1010, transmit circuitry 1015, receive circuitry 1020, and/or radio frequency circuitry 1025.

Figure 10B:
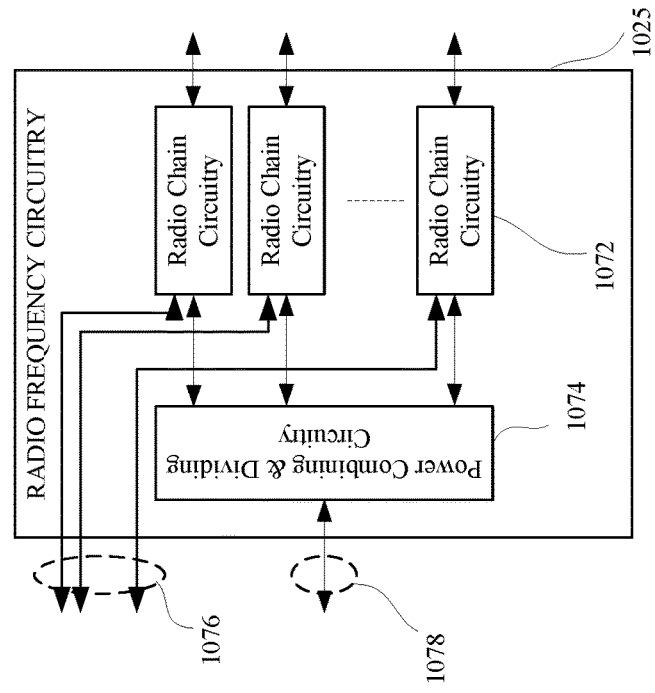

FIG. 10B illustrates an exemplary radio frequency circuitry 1025 in FIG. 10A according to some aspects. The radio frequency circuitry 1025 may include one or more instances of radio chain circuitry 1072, which in some aspects may include one or more filters, power amplifiers, low noise amplifiers, programmable phase shifters and power supplies (not shown).

The radio frequency circuitry 1025 may include power combining and dividing circuitry 1074 such as the tune/retune 240 functional module illustrated in FIG. 2. In some aspects, power combining and dividing circuitry 1074 may operate bidirectionally, such that the same physical circuitry may be configured to operate as a power divider when the device is transmitting, and as a power combiner when the device is receiving. In some aspects, power combining and dividing circuitry 1074 may one or more include wholly or partially separate circuitries to perform power dividing when the device is transmitting and power combining when the device is receiving. In some aspects, power combining and dividing circuitry 1074 may include passive circuitry comprising one or more two-way power divider/combiners arranged in a tree. In some aspects, power combining and dividing circuitry 1074 may include active circuitry comprising amplifier circuits.

In some aspects, the radio frequency circuitry 1025 may connect to transmit circuitry 1015 and receive circuitry 1020 in FIG. 10A via one or more radio chain interfaces 1076 or a combined radio chain interface 1078. The combined radio chain interface 1078 may form a wide or very wide bandwidth.

In some aspects, one or more radio chain interfaces 1076 may provide one or more interfaces to one or more receive or transmit signals, each associated with a single antenna structure which may comprise one or more antennas.

In some aspects, the combined radio chain interface 1078 may provide a single interface to one or more receive or transmit signals, each associated with a group of antenna structures comprising one or more antennas.

Figure 11:
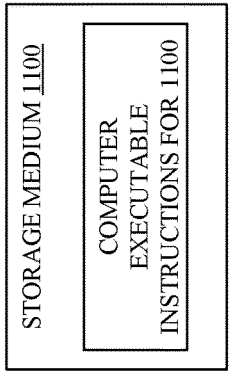
FIG. 11 depicts an embodiment of a storage medium described herein.
Figure 12:
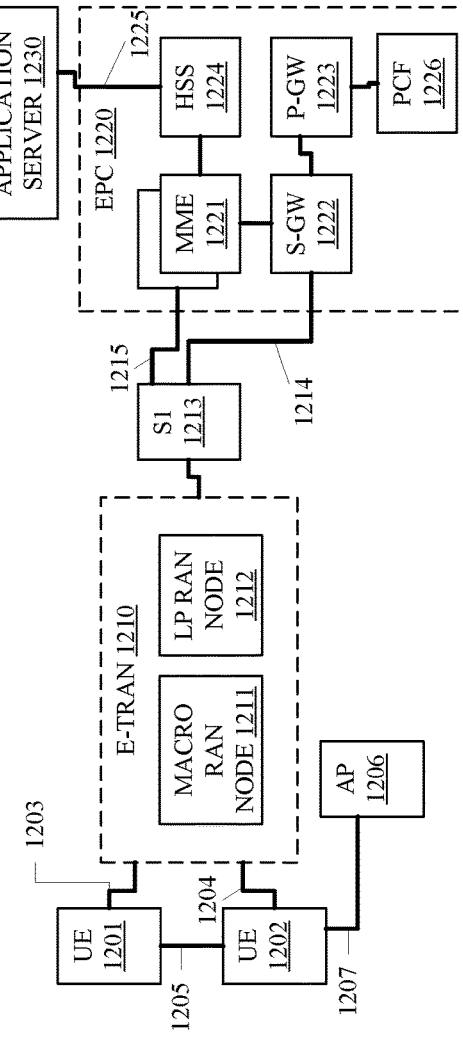
FIG. 12 depicts an embodiment an architecture of a system of a network such as the communication network in FIG. 1.

FIG. 11 illustrates an example of a storage medium 1100 to store processor data structures. Storage medium 1100 may comprise an article of manufacture. In some examples, storage medium 1100 may include any non-transitory computer readable medium or machine-readable medium, such as an optical, magnetic or semiconductor storage. Storage medium 1000 may store diverse types of computer executable instructions, such as instructions to implement logic flows and/or techniques described herein. Examples of a computer readable or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. FIG. 12 illustrates an architecture of a system 1200 of a network in accordance with some embodiments. The system 1200 is shown to include a user equipment (UE) 1201 and a UE 1202. The UEs 1201 and 1202 are illustrated as smartphones (e.g., handheld touch screen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 1201 and 1202 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 1201 and 1202 may to connect, e.g., communicatively couple, with a radio access network (RAN)—in this embodiment, an Evolved Universal Mobile Telecommunications System (UMTS) Terrestrial Radio Access Network (E-UTRAN) 1210. The UEs 1201 and 1202 utilize connections 1203 and 1204, respectively, each of which comprises a physical communications interface or layer (discussed in further detail below); in this example, the connections 1203 and 1204 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 1201 and 1202 may further directly exchange communication data via a ProSe interface 1205. The ProSe interface 1205 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 1202 is shown to be configured to access an access point (AP) 1206 via connection 1207. The connection 1207 can comprise a local wireless connection, such as a connection consistent with any IEEE 802.11 protocol, wherein the AP 1206 would comprise a wireless fidelity (WiFi®) router. In this example, the AP 1206 is shown to be connected to the Internet without connecting to the core network of the wireless system (described in further detail below). The E-UTRAN 1210 can include one or more access nodes that enable the connections 1203 and 1204. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The E-UTRAN 1210 may include one or more RAN nodes for providing macro-cells, e.g., macro RAN node 1211, and one or more RAN nodes for providing femto-cells or pico-cells (e.g., cells having smaller coverage areas, smaller user capacity, or higher bandwidth compared to macro-cells), e.g., low power (LP) RAN node 1212.

Any of the RAN nodes 1211 and 1212 can terminate the air interface protocol and can be the first point of contact for the UEs 1201 and 1202. In some embodiments, any of the RAN nodes 1211 and 1212 can fulfill various logical functions for the E-UTRAN 1210 including, but not limited to, radio network controller (RNC) functions such as radio bearer management, uplink and downlink dynamic radio resource management and data packet scheduling, and mobility management.

In accordance with some embodiments, the UEs 1201 and 1202 can be configured to communicate using Orthogonal Frequency-Division Multiplexing (OFDM) communication signals with each other or with any of the RAN nodes 1211 and 1212 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 1211 and 1212 to the UEs 1201 and 1202, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 1201 and 1202. The physical downlink control channel (PDCCH) may carry information about the transport format and resource allocations related to the PDSCH channel, among other things. It may also inform the UEs 1201 and 1202 about the transport format, resource allocation, and HARQ (Hybrid Automatic Repeat Request) information related to the uplink shared channel. Typically, downlink scheduling (assigning control and shared channel resource blocks to the UE 102 within a cell) may be performed at any of the RAN nodes 1211 and 1212 based on channel quality information fed back from any of the UEs 1201 and 1202. The downlink resource assignment information may be sent on the PDCCH used for (e.g., assigned to) each of the UEs 1201 and 1202.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN nodes 1211 and 1212 may communicate with one another and/or with other access nodes in the E-UTRAN 1210 and/or in another RAN via an X2 interface, which is a signaling interface for communicating data packets between ANs. Some other suitable interface for communicating data packets directly between ANs may be used.

The E-UTRAN 1210 is shown to be communicatively coupled to a core network—in this embodiment, an Evolved Packet Core (EPC) network 1220 via an SI interface 1213. In this embodiment the SI interface 1213 is split into two parts: the S1-U interface 1214, which carries traffic data between the RAN nodes 1211 and 1212 and the serving gateway (S-GW) 1222, and the SI-mobility management entity (MME) interface 1215, which is a signaling interface between the RAN nodes 1211 and 1212 and MMEs 1221.

In this embodiment, the EPC network 1220 comprises the MMEs 1221, the S-GW 1222, the Packet Data Network (PDN) Gateway (P-GW) 1223, and a home subscriber server (HSS) 1224. The MMEs 1221 may be similar in function to the control plane of legacy Serving General Packet Radio Service (GPRS) Support Nodes (SGSN). The MMEs 1221 may manage mobility aspects in access such as gateway selection and tracking area list management. The HSS 1224 may comprise a database for network users, including subscription-related information to support the network entities' handling of communication sessions. The EPC network 1220 may comprise one or several HSSs 1224, depending on the number of mobile subscribers, on the capacity of the equipment, on the organization of the network, etc. For example, the HSS 1224 can provide support for routing/roaming, authentication, authorization, naming/addressing resolution, location dependencies, etc.

The S-GW 1222 may terminate the SI interface 1213 towards the E-UTRAN 1210, and routes data packets between the E-UTRAN 1210 and the EPC network 1220. In addition, the SGW 1222 may be a local mobility anchor point for inter-RAN node handovers and also may provide an anchor for inter-3GPP mobility. Other responsibilities may include lawful intercept, charging, and some policy enforcement.

The P-GW 1223 may terminate an SGi interface toward a PDN. The P-GW 1223 may route data packets between the EPC network 1223 and external networks such as a network including the application server 1230 (alternatively referred to as application function (AF)) via an Internet Protocol (IP) interface 1225. Generally, the application server 1230 may be an element offering applications that use IP bearer resources with the core network (e.g., UMTS Packet Services (PS) domain, LTE PS data services, etc.). In this embodiment, the P-GW 1223 is shown to be communicatively coupled to an application server 1230 via an IP communications interface 1225. The application server 1230 can also be configured to support one or more communication services (e.g., Voice-over-Internet Protocol (VoIP) sessions, PTT sessions, group communication sessions, social networking services, etc.) for the UEs 1201 and 1202 via the EPC network 1220.

The P-GW 1223 may further be a node for policy enforcement and charging data collection. Policy and Charging Enforcement Function (PCRF) 1226 is the policy and charging control element of the EPC network 1220. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 1226 may be communicatively coupled to the application server 1230 via the P-GW 1223. The application server 1230 may signal the PCRF 1226 to indicate a new service flow and select the appropriate Quality of Service (QoS) and charging parameters. The PCRF 1226 may provision this rule into a Policy and Charging Enforcement Function (PCEF) (not shown) with the appropriate traffic flow template (TFT) and QoS class of identifier (QCI), which commences the QoS and charging as specified by the application server 1230.

FIG. 13 illustrates example components of a device 1300 in accordance with some embodiments. In some embodiments, the device 1300 may include application circuitry 1302, baseband circuitry 1304, Radio Frequency (RF) circuitry 1306, front-end module (FEM) circuitry 1308, one or more antennas 1310, and power management circuitry (PMC) 1312 coupled together at least as shown. The components of the illustrated device 1300 may be included in a UE or a RAN node. In some embodiments, the device 1300 may include less elements (e.g., a RAN node may not utilize application circuitry 1302, and instead include a processor/controller to process IP data received from an EPC). In some embodiments, the device 1300 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 1302 may include one or more application processors. For example, the application circuitry 1302 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 1300. In some embodiments, processors of application circuitry 1302 may process IP data packets received from an EPC.

The baseband circuitry 1304 may include circuitry such as, but not limited to, one or more single-core or multi-core processors. The baseband circuitry 1304 may include one or more baseband processors or control logic to process baseband signals received from a receive signal path of the RF circuitry 1306 and to generate baseband signals for a transmit signal path of the RF circuitry 1306. Baseband processing circuitry 1304 may interface with the application circuitry 1302 for generation and processing of the baseband signals and for controlling operations of the RF circuitry 1306. For example, in some embodiments, the baseband circuitry 1304 may include a third generation (3G) baseband processor 1304A, a fourth generation (4G) baseband processor 1304B, a fifth generation (5G) baseband processor 1304C, or other baseband processor(s) 1304D for other existing generations, generations in development or to be developed in the future (e.g., second generation (2G), sixth generation (6G), etc.). The baseband circuitry 1304 (e.g., one or more of baseband processors 1304A-D) may handle various radio control functions that enable communication with one or more radio networks via the RF circuitry 1306. In other embodiments, some or all of the functionality of baseband processors 1304A-D may be included in modules stored in the memory 1304G and executed via a Central Processing Unit (CPU) 1304E. The radio control functions may include, but are not limited to, signal modulation/demodulation, encoding/decoding, radio frequency shifting, etc.

In some embodiments, modulation/demodulation circuitry of the baseband circuitry 1304 may include Fast-Fourier Transform (FFT), preceding, or constellation mapping/demapping functionality. In some embodiments, encoding/decoding circuitry of the baseband circuitry 1304 may include convolution, tail-biting convolution, turbo, Viterbi, or Low-Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1304 may include one or more audio digital signal processor(s) (DSP) 1304F. The audio DSP(s) 1304F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1304 and the application circuitry 1302 may be implemented together such as, for example, on a system on a chip (SOC). In some embodiments, the baseband circuitry 1304 may provide for communication compatible with one or more radio technologies. For example, in some embodiments, the baseband circuitry 1304 may support communication with an evolved universal terrestrial radio access network (E-UTRAN) or other wireless metropolitan area networks (WMAN), a wireless local area network (WLAN), a wireless personal area network (WPAN). Embodiments in which the baseband circuitry 1304 is configured to support radio communications of more than one wireless protocol may be referred to as multi-mode baseband circuitry.

The RF circuitry 1306 may enable communication with wireless networks using modulated electromagnetic radiation through a non-solid medium. In various embodiments, the RF circuitry 1306 may include switches, filters, amplifiers, etc. to facilitate the communication with the wireless network. The RF circuitry 1306 may include a receive signal path which may include circuitry to down-convert RF signals received from the FEM circuitry 1308 and provide baseband signals to the baseband circuitry 1304. The RF circuitry 1306 may also include a transmit signal path which may include circuitry to up-convert baseband signals provided by the baseband circuitry 1304 and provide RF output signals to the FEM circuitry 1308 for transmission.

In some embodiments, the receive signal path of the RF circuitry 1306 may include mixer circuitry 1306a, amplifier circuitry 1306b and filter circuitry 1306c. In some embodiments, the transmit signal path of the RF circuitry 1306 may include filter circuitry 1306c and mixer circuitry 1306a. The RF circuitry 1306 may also include synthesizer circuitry 1306d for synthesizing a frequency, or component carrier, for use by the mixer circuitry 1306a of the receive signal path and the transmit signal path. In some embodiments, the mixer circuitry 1306a of the receive signal path may to down-convert RF signals received from the FEM circuitry 1308 based on the synthesized frequency provided by synthesizer circuitry 1306d. The amplifier circuitry 1306b may amplify the down-converted signals and the filter circuitry 1306c may be a low-pass filter (LPF) or band-pass filter (BPF) to remove unwanted signals from the down-converted signals to generate output baseband signals. Output baseband signals may be provided to the baseband circuitry 1304 for further processing.

In some embodiments, the output baseband signals may be zero-frequency baseband signals, although this is not a requirement. In some embodiments, mixer circuitry 1306a of the receive signal path may comprise passive mixers, although the scope of the embodiments is not limited in this respect.

In some embodiments, the mixer circuitry 1306a of the transmit signal path may be configured to up-convert input baseband signals based on the synthesized frequency provided by the synthesizer circuitry 1306d to generate RF output signals for the FEM circuitry 1308. The baseband signals may be provided by the baseband circuitry 1304 and may be filtered by filter circuitry 1306c.

In some embodiments, the mixer circuitry 1306a of the receive signal path and the mixer circuitry 1306a of the transmit signal path may include two or more mixers and may be arranged for quadrature downconversion and upconversion, respectively. In some embodiments, the mixer circuitry 1306a of the receive signal path and the mixer circuitry 1306a of the transmit signal path may include two or more mixers and may be arranged for image rejection (e.g., Hartley image rejection). In some embodiments, the mixer circuitry 1306a of the receive signal path and the mixer circuitry 1306a may be arranged for direct downconversion and direct upconversion, respectively. In some embodiments, the mixer circuitry 1306a of the receive signal path and the mixer circuitry 1306a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1306 may include analog-to-digital converter (ADC) and digital-to-analog converter (DAC) circuitry and the baseband circuitry 1304 may include a digital baseband interface to communicate with the RF circuitry 1306.

In some dual-mode embodiments, a separate radio IC circuitry may be provided for processing signals for each spectrum, although the scope of the embodiments is not limited in this respect.

In some embodiments, the synthesizer circuitry 1306d may be a fractional-N synthesizer or a fractional N/N+1 synthesizer, although the scope of the embodiments is not limited in this respect as other types of frequency synthesizers may be suitable. For example, synthesizer circuitry 1306d may be a delta-sigma synthesizer, a frequency multiplier, or a synthesizer comprising a phase-locked loop with a frequency divider.

The synthesizer circuitry 1306d may synthesize an output frequency for use by the mixer circuitry 1306a of the RF circuitry 1306 based on a frequency input and a divider control input. In some embodiments, the synthesizer circuitry 1306d may be a fractional N/N+1 synthesizer.

In some embodiments, frequency input may be an output of a voltage controlled oscillator (VCO), although that is not a requirement. Divider control input may be an output of either the baseband circuitry 1304 or the applications processor 1302 depending on the desired output frequency. Some embodiments may determine a divider control input (e.g., N) from a look-up table based on a channel indicated by the applications processor 1302.

The synthesizer circuitry 1306d of the RF circuitry 1306 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 1306d may generate a carrier frequency (or component carrier) as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a local oscillator (LO) frequency (fLO). In some embodiments, the RF circuitry 1306 may include an IQ/polar converter.

The FEM circuitry 1308 may include a receive signal path which may include circuitry to operate on RF signals received from one or more antennas 1310, amplify the received signals and provide the amplified versions of the received signals to the RF circuitry 1306 for further processing. FEM circuitry 1308 may also include a transmit signal path which may include circuitry configured to amplify signals for transmission provided by the RF circuitry 1306 for transmission by one or more of the one or more antennas 1310. In various embodiments, the amplification through the transmit or receive signal paths may be done solely in the RF circuitry 1306, solely in the FEM 1308, or in both the RF circuitry 1306 and the FEM 1308.

In some embodiments, the FEM circuitry 1308 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 1306). The transmit signal path of the FEM circuitry 1308 may include a power amplifier (PA) to amplify input RF signals (e.g., provided by RF circuitry 1306), and one or more filters to generate RF signals for subsequent transmission (e.g., by one or more of the one or more antennas 1310).

In the present embodiment, the radio refers to a combination of the RF circuitry 130 and the FEM 1308. The radio refers to the portion of the circuitry that generates and transmits or receives and processes the radio signals. The RF circuitry 1306 includes a transmitter to generate the time domain radio signals with the data from the baseband signals and apply the radio signals to subcarriers of the carrier frequency that form the bandwidth of the channel. The PA in the FEM 1308 amplifies the tones for transmission and amplifies tones received from the one or more antennas 1310 via the LNA to increase the signal-to-noise ratio (SNR) for interpretation. In wireless communications, the FEM 1308 may also search for a detectable pattern that appears to be a wireless communication. Thereafter, a receiver in the RF circuitry 1306 converts the time domain radio signals to baseband signals via one or more functional modules such as the functional modules shown in the base station 201 and user equipment 211 illustrated in FIG. 2.

In some embodiments, the PMC 1312 may manage power provided to the baseband circuitry 1304. In particular, the PMC 1312 may control power-source selection, voltage scaling, battery charging, or DC-to-DC conversion. The PMC 1312 may often be included when the device 1300 is capable of being powered by a battery, for example, when the device is included in a UE. The PMC 1312 may increase the power conversion efficiency while providing desirable implementation size and heat dissipation characteristics.

While FIG. 13 shows the PMC 1312 coupled only with the baseband circuitry 1304. However, in other embodiments, the PMC 1312 may be additionally or alternatively coupled with, and perform similar power management operations for, other components such as, but not limited to, application circuitry 1302, RF circuitry 1306, or FEM 1308.

In some embodiments, the PMC 1312 may control, or otherwise be part of, various power saving mechanisms of the device 1300. For example, if the device 1300 is in an RRC_Connected state, where it is still connected to the RAN node as it expects to receive traffic shortly, then it may enter a state known as Discontinuous Reception Mode (DRX) after a period of inactivity. During this state, the device 1300 may power down for brief intervals of time and thus save power.

If there is no data traffic activity for an extended period of time, then the device 1300 may transition off to an RRC Idle state, where it disconnects from the network and does not perform operations such as channel quality feedback, handover, etc. The device 1300 goes into a very low power state and it performs paging where again it periodically wakes up to listen to the network and then powers down again. The device 1300 may not receive data in this state, in order to receive data, it must transition back to RRC Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

The processors of the application circuitry 1302 and the processors of the baseband circuitry 1304 may be used to execute elements of one or more instances of a protocol stack. For example, processors of the baseband circuitry 1304, alone or in combination, may be used execute Layer 3, Layer 2, or Layer 1 functionality, while processors of the application circuitry 1304 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

FIG. 14 illustrates example interfaces of baseband circuitry in accordance with some embodiments. As discussed above, the baseband circuitry 1304 of FIG. 13 may comprise processors 1304A-1304E and a memory 1304G utilized by said processors. Each of the processors 1304A-1304E may include a memory interface, 1404A-1404E, respectively, to send/receive data to/from the memory 1304G.

The baseband circuitry 1304 may further include one or more interfaces to communicatively couple to other circuitries/devices, such as a memory interface 1412 (e.g., an interface to send/receive data to/from memory external to the baseband circuitry 1304), an application circuitry interface 1414 (e.g., an interface to send/receive data to/from the application circuitry 1302 of FIG. 13), an RF circuitry interface 1416 (e.g., an interface to send/receive data to/from RF circuitry 1306 of FIG. 13), a wireless hardware connectivity interface 1418 (e.g., an interface to send/receive data to/from Near Field Communication (NFC) components, Bluetooth® components (e.g., Bluetooth® Low Energy), Wi-Fi® components, and other communication components), and a power management interface 1420 (e.g., an interface to send/receive power or control signals to/from the PMC 1312.

Figure 15:
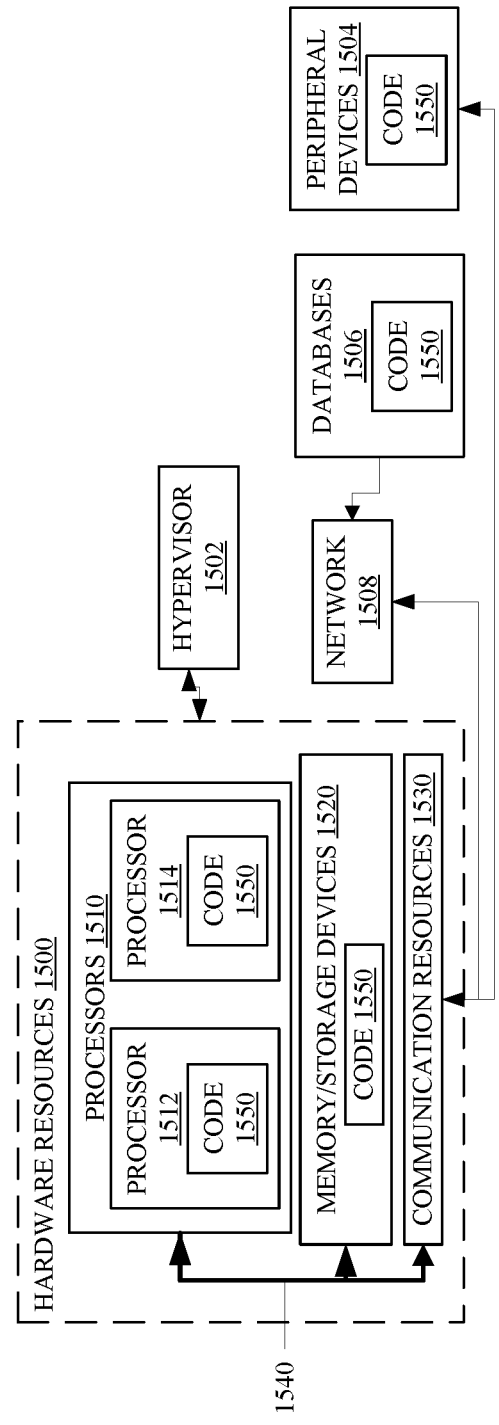
FIG. 15 depicts an embodiment of a block diagram of components.

FIG. 15 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 15 shows a diagrammatic representation of hardware resources 1500 including one or more processors (or processor cores) 1510, one or more memory/storage devices 1520, and one or more communication resources 1530, each of which may be communicatively coupled via a bus 1540. For embodiments where node virtualization (e.g., NFV) is utilized, a hypervisor 1502 may be executed to provide an execution environment for one or more network slices/sub-slices to utilize the hardware resources 1500.

The processors 1510 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1512 and a processor 1514.

The memory/storage devices 1520 may include main memory, disk storage, or any suitable combination thereof. The memory/storage devices 1520 may include, but are not limited to any type of volatile or non-volatile memory such as dynamic random-access memory (DRAM), static random-access memory (SRAM), erasable programmable read-only memory (EPROM), electrically erasable programmable read-only memory (EEPROM), Flash memory, solid-state storage, etc.

The communication resources 1530 may include interconnection or network interface components or other suitable devices to communicate with one or more peripheral devices 1504 or one or more databases 1506 via a network 1508. For example, the communication resources 1530 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1550 may comprise software, a program, an application, an applet, an app, or other executable code for causing at least any of the processors 1510 to perform any one or more of the methodologies discussed herein. The instructions 1550 may reside, completely or partially, within at least one of the processors 1510 (e.g., within the processor's cache memory), the memory/storage devices 1520, or any suitable combination thereof. Furthermore, any portion of the instructions 1550 may be transferred to the hardware resources 1500 from any combination of the peripheral devices 1504 or the databases 1506. Accordingly, the memory of processors 1510, the memory/storage devices 1520, the peripheral devices 1504, and the databases 1506 are examples of computer-readable and machine-readable media.

In embodiments, one or more elements of FIGS. 12, 13, 14, and/or 15 may be configured to perform one or more processes, techniques, or methods as described herein, or portions thereof. In embodiments, one or more elements of FIGS. 12, 13, 14, and/or 15 may be configured to perform one or more processes, techniques, or methods, or portions thereof, as described in the following examples.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code to reduce the number of times code must be retrieved from bulk storage during execution. The term "code" covers a broad range of software components and constructs, including applications, drivers, processes, routines, methods, modules, firmware, microcode, and subprograms. Thus, the term "code" may be used to refer to any collection of instructions which, when executed by a processing system, perform a desired operation or operations.

Logic circuitry, devices, and interfaces herein described may perform functions implemented in hardware and also implemented with code executed on one or more processors. Logic circuitry refers to the hardware or the hardware and code that implements one or more logical functions. Circuitry is hardware and may refer to one or more circuits. Each circuit may perform a particular function. A circuit of the circuitry may comprise discrete electrical components interconnected with one or more conductors, an integrated circuit, a chip package, a chip set, memory, or the like. Integrated circuits include circuits created on a substrate such as a silicon wafer and may comprise components. And integrated circuits, processor packages, chip packages, and chipsets may comprise one or more processors.

Processors may receive signals such as instructions and/or data at the input(s) and process the signals to generate the at least one output. While executing code, the code changes the physical states and characteristics of transistors that make up a processor pipeline. The physical states of the transistors translate into logical bits of ones and zeros stored in registers within the processor. The processor can transfer the physical states of the transistors into registers and transfer the physical states of the transistors to another storage medium.

A processor may comprise circuits or circuitry to perform one or more sub-functions implemented to perform the overall function of the processor. One example of a processor is a state machine or an application-specific integrated circuit (ASIC) that includes at least one input and at least one output. A state machine may manipulate the at least one input to generate the at least one output by performing a predetermined series of serial and/or parallel manipulations or transformations on the at least one input.

Several embodiments have one or more potentially advantages effects. For instance, tuning multiple RF chains based on a central synchronization signal for a wide bandwidth channel without requiring measurement gaps advantageously increases the flexibility to switch channel frequencies. Tuning a single, wide bandwidth RF chain to a central synchronization signal for a wide bandwidth channel and requiring measurement gaps advantageously avoids the cost and complexity involved with logic circuitry that can very accurately measure a central synchronization signal for a wide bandwidth channel without retuning. Receiving a communication that comprises capabilities of the user device advantageously avoids the cost and complexity involved with logic circuitry that can very accurately measure a central synchronization signal for a wide bandwidth channel without retuning. Identifying and measuring inter-frequency cells advantageously avoids the cost and complexity involved with logic circuitry that can very accurately measure a central synchronization signal for a wide bandwidth channel without retuning. Communicating with the user device, one or more radio frames via a wide bandwidth channel of the wide bandwidth carrier frequency advantageously reduces the time expended to communicate and increases data throughput over narrow band communications. Not scheduling traffic data with the user device during the measurement gaps advantageously avoids the interruption requirement by provision of measurement gaps during which a user device can retune one or more RF chains.

Examples of Further Embodiments

The following examples pertain to further embodiments. Specifics in the examples may be used anywhere in one or more embodiments.

Example 1 is an apparatus to perform wide bandwidth communications, comprising: logic circuitry to receive an initial communication from a user device, wherein the initial communication comprises capabilities; to determine when the capabilities for the user device indicate a requirement to implement measurement gaps; and when the capabilities for the user device indicate a requirement to implement measurement gaps, to determine a gap pattern to assign to the user device to re-tune one or more radio frequency chains to a wide bandwidth carrier frequency during communications, wherein the gap pattern comprises a set of measurement gaps; and a physical layer device coupled with the logic circuitry to transmit information about the gap pattern to the user device. In Example 2, the apparatus of Example 1, further comprising a processor, a memory coupled with the processor, a radio coupled with the physical layer device, and one or more antennas coupled with a radio of the physical layer device to communicate with the user device. In Example 3, the apparatus of Example 1, wherein the logic circuitry is configured to communicate with the user device, one or more radio frames via a wide bandwidth channel of the wide bandwidth carrier frequency. In Example 4, the apparatus of Example 1, wherein the logic circuitry is configured to not schedule traffic data with the user device during the measurement gaps. In Example 5, the apparatus of Example 1, wherein the logic circuitry is configured to transmit one or more measurement signals to the user equipment during one or more measurement gaps of the set. In Example 6, the apparatus of Example 1, wherein the information about the gap pattern is indicated by a radio resource control layer (RRC) information element. In Example 7, the apparatus of Example 1, wherein the information about the gap pattern comprises a measurement gap length (MGL) and a measurement gap repetition period (MGRP). In Example 8, the apparatus of Example 1, wherein the information about the gap pattern comprises information about a pattern of non-uniform measurement gaps. In Example 9, the apparatus of Example 8, wherein the information about the pattern of non-uniform measurement gaps comprises a number of gaps per burst and a burst repetition period (Tburst). In Example 10, the apparatus of Example 8, wherein the information about the pattern of non-uniform measurement gaps comprises a definition of a portion (T2) of the gap pattern for communications.

Example 11 is a method to perform wide bandwidth communications, comprising: receiving, by baseband logic circuitry, an initial communication from a user device, wherein the initial communication comprises capabilities; determining, by the baseband logic circuitry, when the capabilities for the user device indicate a requirement to implement measurement gaps; and when the capabilities for the user device indicate a requirement to implement measurement gaps, determining, by the baseband logic circuitry, a gap pattern to assign to the user device to re-tune one or more radio frequency chains to a wide bandwidth carrier frequency during communications with the baseband logic circuitry; and transmitting, by the baseband logic circuitry, information about the gap pattern to the user device, wherein the gap pattern comprises a set of measurement gaps. In Example 12, the method of Example 11, further comprising communicating, by the baseband logic circuitry, with the user device, one or more radio frames via a wide bandwidth channel of the wide bandwidth carrier frequency. In Example 13, the method of Example 11, further comprising not scheduling traffic data with the user device during the measurement gaps. In Example 14, the method of Example 11, further comprising transmitting one or more measurement signals to the user equipment during one or more measurement gaps of the set. In Example 15, the method of Example 11, wherein the information about the gap pattern is indicated by a radio resource control layer (RRC) information element. In Example 16, the method of Example 11, wherein the information about the gap pattern comprises a measurement gap length (MGL) and a measurement gap repetition period (MGRP). In Example 17, the method of Example 11, wherein the information about the gap pattern comprises information about a pattern of non-uniform measurement gaps. In Example 18, the method of Example 17, wherein the information about the pattern of non-uniform measurement gaps comprises a number of gaps per burst and a burst repetition period (Tburst). In Example 19, the method of Example 17, wherein the information about the pattern of non-uniform measurement gaps comprises a definition of a portion (T2) of the gap pattern for communications.

Example 20 is a system comprising: one or more antennas; logic circuitry to receive an initial communication from a user device, wherein the initial communication comprises capabilities; to determine when the capabilities for the user device indicate a requirement to implement measurement gaps; and when the capabilities for the user device indicate a requirement to implement measurement gaps, to determine a gap pattern to assign to the user device to re-tune one or more radio frequency chains to a wide bandwidth carrier frequency during communications; and a physical layer device coupled with the logic circuitry and the one or more antennas to transmit information about the gap pattern to the user device. In Example 21, the system of Example 20, wherein the logic circuitry comprises a processor, and a memory coupled with the processor, and the physical layer device comprises a radio, and wherein the apparatus further comprises one or more antennas coupled with the radio to communicate with the user device. In Example 22, the system of Example 20, wherein the logic circuitry is configured to communicate with the user device, one or more radio frames via a wide bandwidth channel of the wide bandwidth carrier frequency. In Example 23, the system of Example 20, wherein the logic circuitry is configured to not schedule traffic data with the user device during the measurement gaps. In Example 24, the system of Example 20, wherein the logic circuitry is configured to transmit one or more measurement signals to the user equipment during one or more measurement gaps of the set. In Example 25, the system of Example 20, wherein the information about the gap pattern is indicated by a radio resource control layer (RRC) information element. In Example 26, the system of Example 20, wherein the information about the gap pattern comprises a measurement gap length (MGL) and a measurement gap repetition period (MGRP). In Example 27. The system of Example 20, wherein the information about the gap pattern comprises information about a pattern of non-uniform measurement gaps. In Example 28, the system of Example 27, wherein the information about the pattern of non-uniform measurement gaps comprises a number of gaps per burst and a burst repetition period (Tburst). In Example 29, the system of Example 27, wherein the information about the pattern of non-uniform measurement gaps comprises a definition of a portion (T2) of the gap pattern for communications.

Example 30 is a non-transitory machine-readable medium containing instructions, which when executed by a processor, cause the processor to perform operations, the operations comprising: receiving, by baseband logic circuitry, an initial communication from a user device, wherein the initial communication comprises capabilities; determining, by the baseband logic circuitry, when the capabilities for the user device indicate a requirement to implement measurement gaps; and when the capabilities for the user device indicate a requirement to implement measurement gaps, determining, by the baseband logic circuitry, a gap pattern to assign to the user device to re-tune one or more radio frequency chains to a wide bandwidth carrier frequency during communications; and transmitting, by the baseband logic circuitry, information about the gap pattern to the user device. In Example 31, the machine-readable medium of Example 30, wherein the operations further comprise communicating with the user device, one or more radio frames via a wide bandwidth channel of the wide bandwidth carrier frequency. In Example 32, the machine-readable medium of Example 30, wherein the operations further comprise not scheduling traffic data with the user device during the measurement gaps. In Example 33, the machine-readable medium of Example 30, wherein the operations further comprise transmitting one or more measurement signals to the user equipment during one or more measurement gaps of the set. In Example 34, the machine-readable medium of Example 30, wherein the information about the gap pattern is indicated by a radio resource control layer (RRC) information element. In Example 35, the machine-readable medium of Example 30, wherein the information about the gap pattern comprises a measurement gap length (MGL) and a measurement gap repetition period (MGRP). In Example 36, the machine-readable medium of Example 30, wherein the information about the gap pattern comprises information about a pattern of non-uniform measurement gaps. In Example 37, the machine-readable medium of Example 36, wherein the information about the pattern of non-uniform measurement gaps comprises a number of gaps per burst and a burst repetition period (Tburst). In Example 38, the machine-readable medium of Example 36, wherein the information about the pattern of non-uniform measurement gaps comprises a definition of a portion (T2) of the gap pattern for communications.

Example 39 is a device to perform wide bandwidth communications, comprising: a means for receiving an initial communication from a user device, wherein the initial communication comprises capabilities; a means for determining when the capabilities for the user device indicate a requirement to implement measurement gaps; and when the capabilities for the user device indicate a requirement to implement measurement gaps, a means for determining a gap pattern to assign to the user device to re-tune one or more radio frequency chains to a wide bandwidth carrier frequency during communications; and transmitting, by the baseband logic circuitry, information about the gap pattern to the user device, wherein the gap pattern comprises a set of measurement gaps. In Example 36, the device of Example 39, further comprising a means for communicating, by the baseband logic circuitry, with the user device, one or more radio frames via a wide bandwidth channel of the wide bandwidth carrier frequency. In Example 37, the device of Example 39, further comprising a means for not scheduling traffic data with the user device during the measurement gaps. In Example 38, the device of Example 39, further comprising a means for transmitting one or more measurement signals to the user equipment during one or more measurement gaps of the set. In Example 39, the device of Example 39, wherein the information about the gap pattern is indicated by a radio resource control layer (RRC) information element. In Example 40, the device of Example 39, wherein the information about the gap pattern comprises a measurement gap length (MGL) and a measurement gap repetition period (MGRP). In Example 41, the device of Example 39, wherein the information about the gap pattern comprises information about a pattern of non-uniform measurement gaps. In Example 42, the device of Example 41, wherein the information about the pattern of non-uniform measurement gaps comprises a number of gaps per burst and a burst repetition period (Tburst). In Example 43, the device of Example 41, wherein the information about the pattern of non-uniform measurement gaps comprises a definition of a portion (T2) of the gap pattern for communications.

Example 44 is an apparatus to perform wide bandwidth communications, comprising: a physical layer device; and logic circuitry coupled with the physical layer device to transmit an initial communication to a base station, wherein the initial communication comprises capabilities for a user device, wherein the capabilities indicate a requirement to implement measurement gaps by the user device; to receive a subsequent communication from the base station, the subsequent communication comprising information about a gap pattern, wherein the gap pattern comprises a set of measurement gaps; to receive a synchronization signal from the base station; to synchronize a wide bandwidth, radio frequency chain based on the synchronization signal; and to retune the radio frequency chain during one or more measurement gaps defined by the gap pattern. In Example 45, the apparatus of Example 44, further comprising a processor, a memory coupled with the processor, a radio coupled with the physical layer device, and one or more antennas coupled with a radio of the physical layer device to communicate with the user device. In Example 46, the apparatus of Example 44, wherein the logic circuitry is configured to identify and measure inter-frequency cells. In Example 47, the apparatus of Example 44, wherein the logic circuitry is configured to not transmit data during the measurement gaps. In Example 48, the apparatus of Example 44, wherein the logic circuitry is configured to not transmit and receive data in a secondary cell group (SCG) during the measurement gaps. In Example 49, the apparatus of Example 44, wherein the logic circuitry is configured to support gap patterns based on measurement capabilities of the user device. In Example 50, the apparatus of Example 44, wherein the logic circuitry is configured to perform at least one measurement of a configured measurement type of detected cells on all the layers of carrier frequencies. In Example 51, the apparatus of Example 44, wherein the logic circuitry is configured to monitor at least 12 carrier frequency layers. In Example 52, the apparatus of Example 44, wherein the logic circuitry is configured to perform at least one measurement of a configured measurement type of detected cells on all the layers of carrier frequencies, wherein the configured measurement types comprise at least Reference Signal Received Power (RSRP), Reference Signal Received Quality (RSRQ), Reference Signal-Signal to Noise and Interference Ratio (RS-SINR), New Radio Synchronization Signal-Reference Signal Received Power (NR SS-RSRP), New Radio Synchronization Signal-Reference Signal Received Quality (NR SS-RSRQ), and New Radio Synchronization Signal-Signal to Noise and Interference Ratio (NR SS-SINR).

Example 53 is a method to perform wide bandwidth communications, comprising: transmitting, by baseband logic circuitry, an initial communication to a base station, wherein the initial communication comprises capabilities for a user device, wherein the capabilities indicate a requirement to implement measurement gaps by the user device; receiving, by baseband logic circuitry, a subsequent communication from the base station, the subsequent communication comprising information about a gap pattern, wherein the gap pattern comprises a set of measurement gaps; receiving, by baseband logic circuitry, a synchronization signal from the base station; synchronizing, by baseband logic circuitry, a wide bandwidth, radio frequency chain based on the synchronization signal; and retuning, by baseband logic circuitry, the radio frequency chain during one or more measurement gaps defined by the gap pattern. In Example 54, the method of Example 53, further comprising communicating, by the baseband logic circuitry, with the base station, one or more radio frames via a wide bandwidth channel of the wide bandwidth carrier frequency. In Example 55, the method of Example 53, further comprising identifying and measuring inter-frequency cells. In Example 56, the method of Example 53, further comprising identifying and measuring inter-radio access technology (inter-RAT) cells. In Example 57, the method of Example 53, wherein the user device does not transmit data during the measurement gaps. In Example 58, the method of Example 53, wherein the user device does not transmit and receive data in a secondary cell group (SCG) during the measurement gaps. In Example 59, the method of Example 53, wherein the user device supports gap patterns based on measurement capabilities of the user device. In Example 60, the method of Example 53, wherein the user device is capable of performing at least one measurement of a configured measurement type of detected cells on all the layers of carrier frequencies. In Example 61, the method of Example 53, wherein the user device is capable of monitoring at least 12 carrier frequency layers. In Example 62, the method of Example 53, wherein the user device is capable of performing at least one measurement of a configured measurement type of detected cells on all the layers of carrier frequencies, wherein the configured measurement types comprise at least Reference Signal Received Power (RSRP), Reference Signal Received Quality (RSRQ), Reference Signal-Signal to Noise and Interference Ratio (RS-SINR), New Radio Synchronization Signal-Reference Signal Received Power (NR SS-RSRP), New Radio Synchronization Signal-Reference Signal Received Quality (NR SS-RSRQ), and New Radio Synchronization Signal-Signal to Noise and Interference Ratio (NR SS-SINR).

Example 63 is a system comprising: one or more antennas; logic circuitry to receive an initial communication from a user device, wherein the initial communication comprises capabilities; to determine when the capabilities for the user device indicate a requirement to implement measurement gaps; and when the capabilities for the user device indicate a requirement to implement measurement gaps, to determine a gap pattern to assign to the user device to re-tune one or more radio frequency chains to a wide bandwidth carrier frequency during communications; and a physical layer device coupled with the logic circuitry and the one or more antennas to transmit information about the gap pattern to the user device. In Example 64, the system of Example 63, wherein the logic circuitry comprises a processor, and a memory coupled with the processor, and the physical layer device comprises a radio, and wherein the apparatus further comprises one or more antennas coupled with the radio to communicate with the user device. In Example 65, the system of Example 63, wherein the logic circuitry is configured to identify and measure inter-frequency cells. In Example 66, the system of Example 63, wherein the logic circuitry is configured to not transmit data during the measurement gaps. In Example 67, the system of Example 63, wherein the logic circuitry is configured to not transmit and receive data in a secondary cell group (SCG) during the measurement gaps. In Example 68, the system of Example 63, wherein the logic circuitry is configured to support gap patterns based on measurement capabilities of the user device. In Example 69, the system of Example 63, wherein the logic circuitry is configured to perform at least one measurement of a configured measurement type of detected cells on all the layers of carrier frequencies. In Example 70, the system of Example 63, wherein the logic circuitry is configured to monitor at least 12 carrier frequency layers. In Example 71, the system of Example 63, wherein the logic circuitry is configured to performing at least one measurement of a configured measurement type of detected cells on all the layers of carrier frequencies, wherein the configured measurement types comprise at least Reference Signal Received Power (RSRP), Reference Signal Received Quality (RSRQ), Reference Signal-Signal to Noise and Interference Ratio (RS-SINR), New Radio Synchronization Signal-Reference Signal Received Power (NR SS-RSRP), New Radio Synchronization Signal-Reference Signal Received Quality (NR SS-RSRQ), and New Radio Synchronization Signal-Signal to Noise and Interference Ratio (NR SS-SINR).

Example 72 is a non-transitory machine-readable medium containing instructions, which when executed by a processor, cause the processor to perform operations, the operations comprising: transmitting an initial communication to a base station, wherein the initial communication comprises capabilities for a user device, wherein the capabilities indicate a requirement to implement measurement gaps by the user device; receiving a subsequent communication from the base station, the subsequent communication comprising information about a gap pattern, wherein the gap pattern comprises a set of measurement gaps; receiving a synchronization signal from the base station; synchronizing a wide bandwidth, radio frequency chain based on the synchronization signal; and retuning the radio frequency chain during one or more measurement gaps defined by the gap pattern. In Example 73, the machine-readable medium of Example 72, wherein the operations further comprise communicating with the base station, one or more radio frames via a wide bandwidth channel of the wide bandwidth carrier frequency. In Example 74, the machine-readable medium of Example 72, wherein the operations further comprise identifying and measuring inter-frequency cells. In Example 75, the machine-readable medium of Example 72, wherein the operations further comprise identifying and measuring inter-radio access technology (inter-RAT) cells. In Example 76, the machine-readable medium of Example 72, wherein the user device does not transmit data during the measurement gaps. In Example 77, the machine-readable medium of Example 72, wherein the user device does not transmit and receive data in a secondary cell group (SCG) during the measurement gaps. In Example 78, the machine-readable medium of Example 72, wherein the user device supports gap patterns based on measurement capabilities of the user device. In Example 79, the machine-readable medium of Example 72, wherein the user device is capable of performing at least one measurement of a configured measurement type of detected cells on all the layers of carrier frequencies. In Example 80, the machine-readable medium of Example 72, wherein the user device is capable of monitoring at least 12 carrier frequency layers. In Example 81, the machine-readable medium of Example 72, wherein the user device is capable of performing at least one measurement of a configured measurement type of detected cells on all the layers of carrier frequencies, wherein the configured measurement types comprise at least Reference Signal Received Power (RSRP), Reference Signal Received Quality (RSRQ), Reference Signal-Signal to Noise and Interference Ratio (RS-SINR), New Radio Synchronization Signal-Reference Signal Received Power (NR SS-RSRP), New Radio Synchronization Signal-Reference Signal Received Quality (NR SS-RSRQ), and New Radio Synchronization Signal-Signal to Noise and Interference Ratio (NR SS-SINR).

Example 82 is a device to perform wide bandwidth communications, comprising: a means for transmitting an initial communication to a base station, wherein the initial communication comprises capabilities for a user device, wherein the capabilities indicate a requirement to implement measurement gaps by the user device; a means for receiving a subsequent communication from the base station, the subsequent communication comprising information about a gap pattern, wherein the gap pattern comprises a set of measurement gaps; a means for receiving a synchronization signal from the base station; a means for synchronizing a wide bandwidth, radio frequency chain based on the synchronization signal; and a means for retuning the radio frequency chain during one or more measurement gaps defined by the gap pattern. In Example 83, the device of Example 82, further comprising a means for communicating with the base station, one or more radio frames via a wide bandwidth channel of the wide bandwidth carrier frequency. In Example 84, the device of Example 82, further comprising a means for identifying and measuring inter-frequency cells. In Example 85, the device of Example 82, further comprising a means for identifying and measuring inter-radio access technology (inter-RAT) cells. In Example 86, the device of Example 82, wherein the user device does not transmit data during the measurement gaps. In Example 87, the device of Example 82, wherein the user device does not transmit and receive data in a secondary cell group (SCG) during the measurement gaps. In Example 88, the device of Example 82, wherein the user device supports gap patterns based on measurement capabilities of the user device. In Example 89, the device of Example 82, wherein the user device is capable of performing at least one measurement of a configured measurement type of detected cells on all the layers of carrier frequencies. In Example 90, the device of Example 53, wherein the user device is capable of monitoring at least 12 carrier frequency layers. In Example 91, the device of Example 53, wherein the user device is capable of performing at least one measurement of a configured measurement type of detected cells on all the layers of carrier frequencies, wherein the configured measurement types comprise at least Reference Signal Received Power (RSRP), Reference Signal Received Quality (RSRQ), Reference Signal-Signal to Noise and Interference Ratio (RS-SINR), New Radio Synchronization Signal-Reference Signal Received Power (NR SS-RSRP), New Radio Synchronization Signal-Reference Signal Received Quality (NR SS-RSRQ), and New Radio Synchronization Signal-Signal to Noise and Interference Ratio (NR SS-SINR).

Example 92, an apparatus to perform wide bandwidth communications, comprising: a physical layer device comprising more than one radio frequency chains to aggregate with carrier aggregation to form a wider bandwidth operation (BWP); and logic circuitry coupled with the physical layer device to transmit an initial communication to a base station to connect with a radio resource control (RRC) layer of the base station, wherein the initial communication comprises capabilities for a user device, wherein the capabilities indicate a lack of a requirement to implement measurement gaps by the user device; to receive a synchronization signal from the base station; to synchronize the more than one radio frequency chains of the BWP based on the synchronization signal; and to communicate with the base station via the BWP in accordance with an interruption requirement. In Example 93, the apparatus of Example 92, further comprising a processor, a memory coupled with the processor, a radio coupled with the physical layer device, and one or more antennas coupled with a radio of the physical layer device to communicate with the user device. In Example 94, the apparatus of Example 92, wherein the logic circuitry is configured to identify and measure inter-frequency cells. In Example 95, the apparatus of Example 92, wherein the interruption requirement allows the user device an interruption of up to X subframes of radio frames, wherein X is a positive integer. In Example 96, the apparatus of Example 92, wherein the interruption requirement allows the user device an interruption of up to X subframes on primary cell (PCell) for both uplink and downlink communications, wherein X is a positive integer. In Example 97, the apparatus of Example 92, wherein the interruption requirement allows the user device an interruption of up to a percentage of communications. In Example 98, the apparatus of Example 92, wherein the interruption requirement allows the user device an interruption of up to a percentage of subframes of a radio frame. In Example 99, the apparatus of Example 92, wherein the interruption requirement allows the user device an interruption of up to a percentage of subframes on primary cell (PCell) for both uplink and downlink communications.

Example 100, a method to perform wide bandwidth communications, comprising: transmitting, by baseband logic circuitry, an initial communication to a base station to connect with a radio resource control (RRC) layer of the base station, wherein the initial communication comprises capabilities for a user device, wherein the capabilities indicate a lack of a requirement to implement measurement gaps by the user device; receiving, by baseband logic circuitry, a synchronization signal from the base station; synchronizing, by baseband logic circuitry, more than one radio frequency chains to aggregate with carrier aggregation to form a wider bandwidth operation (BWP) based on the synchronization signal; communicating with the base station via the BWP in accordance with an interruption requirement. In Example 101, the method of Example 100, further comprising identifying and measuring inter-frequency cells. In Example 102, the method of Example 100, wherein the interruption requirement allows the user device an interruption of up to X subframes of radio frames, wherein X is a positive integer. In Example 103, the method of Example 100, wherein the interruption requirement allows the user device an interruption of up to X subframes on primary cell (PCell) for both uplink and downlink communications, wherein X is a positive integer. In Example 104, the method of Example 100, wherein the interruption requirement allows the user device an interruption of up to a percentage of communications. In Example 105, the method of Example 100, wherein the interruption requirement allows the user device an interruption of up to a percentage of subframes of a radio frame. In Example 106, the method of Example 100, wherein the interruption requirement allows the user device an interruption of up to a percentage of subframes on primary cell (PCell) for both uplink and downlink communications.

Example 107, a system comprising: one or more antennas; a physical layer device coupled with the one or more antennas and comprising more than one radio frequency chains to aggregate with carrier aggregation to form a wider bandwidth operation (BWP); and logic circuitry coupled with the physical layer device to transmit an initial communication to a base station to connect with a radio resource control (RRC) layer of the base station, wherein the initial communication comprises capabilities for a user device, wherein the capabilities indicate a lack of a requirement to implement measurement gaps by the user device; to receive a synchronization signal from the base station; to synchronize the more than one radio frequency chains of the BWP based on the synchronization signal; and to communicate with the base station via the BWP in accordance with an interruption requirement. In Example 108, the system of Example 107, wherein the logic circuitry comprises a processor, and a memory coupled with the processor, and the physical layer device comprises a radio, and wherein the apparatus further comprises one or more antennas coupled with the radio to communicate with the user device. In Example 109, the system of Example 107, wherein the logic circuitry is configured to identify and measure inter-frequency cells. In Example 110, the system of Example 107, wherein the interruption requirement allows the user device an interruption of up to X subframes of radio frames, wherein X is a positive integer. In Example 111, the system of Example 107, wherein the interruption requirement allows the user device an interruption of up to X subframes on primary cell (PCell) for both uplink and downlink communications, wherein X is a positive integer. In Example 112, the system of Example 107, wherein the interruption requirement allows the user device an interruption of up to a percentage of communications. In Example 113, the system of Example 107, wherein the interruption requirement allows the user device an interruption of up to a percentage of subframes of a radio frame. In Example 114, the system of Example 107, wherein the interruption requirement allows the user device an interruption of up to a percentage of subframes on primary cell (PCell) for both uplink and downlink communications.

Example 115, a non-transitory machine-readable medium containing instructions, which when executed by a processor, cause the processor to perform operations, the operations comprising: transmitting, by baseband logic circuitry, an initial communication to a base station to connect with a radio resource control (RRC) layer of the base station, wherein the initial communication comprises capabilities for a user device, wherein the capabilities indicate a lack of a requirement to implement measurement gaps by the user device; receiving, by baseband logic circuitry, a synchronization signal from the base station; synchronizing, by baseband logic circuitry, more than one radio frequency chains to aggregate with carrier aggregation to form a wider bandwidth operation (BWP) based on the synchronization signal; communicating with the base station via the BWP in accordance with an interruption requirement. In Example 116, the machine-readable medium of Example 115, wherein the operations further comprise identifying and measuring inter-frequency cells. In Example 117, the machine-readable medium of Example 115, wherein the interruption requirement allows the user device an interruption of up to X subframes of radio frames, wherein X is a positive integer. In Example 118, the machine-readable medium of Example 115, wherein the interruption requirement allows the user device an interruption of up to X subframes on primary cell (PCell) for both uplink and downlink communications, wherein X is a positive integer. In Example 119, the machine-readable medium of Example 115, wherein the interruption requirement allows the user device an interruption of up to a percentage of communications. In Example 120, the machine-readable medium of Example 115, wherein the interruption requirement allows the user device an interruption of up to a percentage of subframes of a radio frame. In Example 121, the machine-readable medium of Example 115, wherein the interruption requirement allows the user device an interruption of up to a percentage of subframes on primary cell (PCell) for both uplink and downlink communications.

Example 122, a device to perform wide bandwidth communications, comprising: a means for transmitting an initial communication to a base station to connect with a radio resource control (RRC) layer of the base station, wherein the initial communication comprises capabilities for a user device, wherein the capabilities indicate a lack of a requirement to implement measurement gaps by the user device; a means for receiving a synchronization signal from the base station; a means for synchronizing more than one radio frequency chains to aggregate with carrier aggregation to form a wider bandwidth operation (BWP) based on the synchronization signal; a means for communicating with the base station via the BWP in accordance with an interruption requirement. In Example 123, the device of Example 122, further comprising a means for identifying and measuring inter-frequency cells. In Example 124, the device of Example 122, wherein the interruption requirement allows the user device an interruption of up to X subframes of radio frames, wherein X is a positive integer. In Example 125, the device of Example 122, wherein the interruption requirement allows the user device an interruption of up to X subframes on primary cell (PCell) for both uplink and downlink communications, wherein X is a positive integer. In Example 126, the device of Example 122, wherein the interruption requirement allows the user device an interruption of up to a percentage of communications. In Example 127, the device of Example 122, wherein the interruption requirement allows the user device an interruption of up to a percentage of subframes of a radio frame. In Example 128, the device of Example 122, wherein the interruption requirement allows the user device an interruption of up to a percentage of subframes on primary cell (PCell) for both uplink and downlink communications.

What is claimed is:
1. An apparatus to perform wide bandwidth communications, comprising:
   baseband circuitry; and
   an interface coupled with the baseband circuitry, to couple with radio frequency (RF) circuitry to switch a bandwidth operation (BWP) and, during switching of the

BWP, to cause up to a maximum interruption in communications with another cell in accordance with an interruption requirement, wherein the interruption requirement allows the maximum interruption of up to a percentage of subframes of a radio frame.

2. The apparatus of claim 1, further comprising the interface coupled with the baseband circuitry to receive a synchronization signal from a radio resource control (RRC) layer of a base station.

3. The apparatus of claim 1, further comprising the RF circuitry and one or more antennas coupled with a radio the RF circuitry to communicate with another device.

4. The apparatus of claim 1, further comprising the interface coupled with the baseband circuitry to synchronize one wide bandwidth RF chain of the BWP, the synchronization to cause up to a maximum interruption in communications with another cell in accordance with an interruption requirement.

5. The apparatus of claim 1, further comprising the interface coupled with the baseband circuitry to aggregate more than one RF chains with carrier aggregation and to synchronize the more than one RF chains of the BWP, the synchronization to cause up to a maximum interruption in communications with another cell in accordance with an interruption requirement.

6. The apparatus of claim 1, switching the BWP to involve subcarrier spacing.

7. The apparatus of claim 1, wherein the apparatus operation is non-standalone, dual connectivity, to switch the BWP from a narrow bandwidth to the wide bandwidth.

8. A method to perform wide bandwidth communications, comprising: aggregating, by baseband circuitry via an interface to couple with radio frequency (RF) circuitry, one or more RF chains to switch a bandwidth operation (BWP);

and during switching of the BWP, causing up to a maximum interruption in communications with another cell in accordance with an interruption requirement, wherein the interruption requirement allows the maximum interruption of up to a percentage of subframes of a radio frame.

9. The method of claim 8, further comprising receiving a synchronization signal from a radio resource control (RRC) layer of a base station to synchronize the one or more RF chains of the BWP.

10. The method of claim 8, further comprising synchronizing one wide bandwidth RF chain of the BWP, the synchronization to cause up to a maximum interruption in communications with another cell in accordance with an interruption requirement.

11. The method of claim 8, further comprising aggregating more than one RF chains with carrier aggregation and synchronizing the more than one RF chains of the BWP, the synchronization to cause up to a maximum interruption in communications with another cell in accordance with an interruption requirement.

12. The method of claim 8, switching the BWP to involve subcarrier spacing.

13. The method of claim 8, wherein operation of the baseband circuitry is non-standalone, dual connectivity, to switch the BWP from a narrow bandwidth to the wide bandwidth.

14. A non-transitory machine-readable medium containing instructions, which when executed by a processor, cause the processor to perform operations, the operations comprising: aggregating, via an interface to couple with radio frequency (RF) circuitry, one or more RF chains to switch a bandwidth operation (BWP);

and during switching of the BWP, causing up to a maximum interruption in communications with another cell in accordance with an interruption requirement, wherein the interruption requirement allows the maximum interruption of up to a percentage of subframes of a radio frame.

15. The machine-readable medium of claim 14, wherein the operations further comprise receiving a synchronization signal from a radio resource control (RRC) layer of a base station to synchronize the more than one RF chains of the BWP.

16. The machine-readable medium of claim 14, wherein the operations further comprise synchronizing one wide bandwidth RF chain of the BWP, the synchronization to cause up to a maximum interruption in communications with another cell in accordance with an interruption requirement.

17. The machine-readable medium of claim 14, wherein the operations further comprise aggregating more than one RF chains with carrier aggregation and synchronizing the more than one RF chains of the BWP, the synchronization to cause up to a maximum interruption in communications with another cell in accordance with an interruption requirement.

18. The machine-readable medium of claim 14, switching the BWP to involve subcarrier spacing.

19. The machine-readable medium of claim 14, wherein operation of the processor is non-standalone, dual connectivity, to switch the BWP from a narrow bandwidth to the wide bandwidth.

\* \* \* \* \*